(12) United States Patent
Kitoh et al.

(10) Patent No.: US 7,580,597 B2
(45) Date of Patent: Aug. 25, 2009

(54) OPTICAL FUNCTIONAL CIRCUIT

(75) Inventors: Tsutomu Kitoh, Atsugi (JP); Yohei Sakamaki, Atsugi (JP); Toshikazu Hashimoto, Yamato (JP); Takashi Saida, Sagamihara (JP); Hiroshi Takahashi, Atsugi (JP); Masahiro Yanagisawa, Mito (JP); Ikuo Ogawa, Atsugi (JP); Tomohiro Shibata, Tokyo (JP); Senichi Suzuki, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/584,820

(22) PCT Filed: Jul. 1, 2005

(86) PCT No.: PCT/JP2005/012186

§ 371 (c)(1),
(2), (4) Date: Jan. 24, 2008

(87) PCT Pub. No.: WO2006/004031

PCT Pub. Date: Jan. 12, 2006

(65) Prior Publication Data

US 2008/0232736 A1 Sep. 25, 2008

(30) Foreign Application Priority Data

Jul. 2, 2004 (JP) .............................. 2004-197313
Oct. 29, 2004 (JP) .............................. 2004-317092

(51) Int. Cl.
*G02B 6/12* (2006.01)
(52) U.S. Cl. ................. 385/14; 385/39; 385/49
(58) Field of Classification Search ................. 385/14, 385/39, 49
See application file for complete search history.

(56) References Cited

U.S. PATENT DOCUMENTS

| 7,397,977 B2 * | 7/2008 | Hashimoto et al. ............ 385/14 |
| 2005/0200942 A1 * | 9/2005 | Grot et al. .................... 359/321 |
| 2005/0254770 A1 * | 11/2005 | Watanabe .................... 385/137 |
| 2006/0067619 A1 * | 3/2006 | Welch et al. .................. 385/37 |

FOREIGN PATENT DOCUMENTS

JP 60-202553 10/1985

(Continued)

OTHER PUBLICATIONS

Yoshinori Hibino, *Passive Optical Devices for Photonic Networks*, IEICE Trans. Commun., vol. E83-B, No. 10, Oct. 2000., pp. 2178-2190.

(Continued)

*Primary Examiner*—Ellen Kim
(74) *Attorney, Agent, or Firm*—Workman Nydegger

(57) ABSTRACT

The present invention provides an optical functional circuit where a holographic wave propagation medium is applied and a circuit property is excellent such as small transmission loss and crosstalk. The optical functional circuit where a plurality of circuit elements are formed on a substrate includes the wave propagation medium for converting an optical path of a leakage light so that the leakage light that is not emitted from a predetermined output port of the circuit element is not coupled to a different circuit element. This wave propagation medium is constituted by an optical waveguide that is provided with a clad layer formed on the substrate and a core embedded in the clad layer, and a part of the optical waveguide is formed in accordance with a refractive index distribution which is multiple scattered.

12 Claims, 22 Drawing Sheets

FOREIGN PATENT DOCUMENTS

| | | |
|---|---|---|
| JP | 04-316005 | 11/1992 |
| JP | 05-011135 | 1/1993 |
| JP | 08-190028 | 7/1996 |
| JP | 08-313744 | 11/1996 |
| JP | 10-186184 | 7/1998 |
| JP | 10-332966 | 12/1998 |
| JP | 2002-031731 | 1/2002 |
| JP | 2004-046021 | 2/2004 |
| WO | WO 03007038 | 1/2003 |
| WO | WO 2004/059354 A1 | 7/2004 |

OTHER PUBLICATIONS

Yabu Tetsuro et al., *New Design Method for Low Loss Y-branch Waveguides*, The Institute of Electronics, Information and Communication Engineers, vol. 100, No. 68, May 12, 2000, pp. 65-72.

\* cited by examiner

OPTICAL FUNCTIONAL CIRCUIT

TECHNICAL FIELD

The present invention relates to an optical functional circuit, and more particularly, to an optical functional circuit which uses a holographic wave propagation medium to propagate a wave holographically through multiple scattering in accordance with a two-dimensional refractive index distribution.

BACKGROUND ART

In an optical communication field, as an optical circuit which can easily attain the branch and interference of light, an integrated optical part using an optical waveguide structure has been developed. In the integrated optical part using the characteristic as the wave of the light, an optical waveguide length is adjusted to make the manufacturing of an optical interferometer easier, or a circuit processing technique in a semiconductor field is applied, which makes the integration of the optical parts easier.

Such an optical waveguide structure is an "optical confinement structure" where with regard to the light propagating through the optical waveguide, the spatial distribution of refractive indexes is used to attain a spatial optical confinement. In order to constitute the optical circuit, an optical wiring and the like are used to connect respective components in cascade arrangement. For this reason, an optical path length of the optical waveguide circuit must be longer than an optical path length required to generate an interference phenomenon and the like inside the optical circuit. This results in a problem that the optical circuit itself is extremely large in scale.

For example, when a typical arrayed waveguide grating is exemplified, a plurality of lights having a wavelength ($\lambda_j$) inputted from an input port are repeatedly branched and coupled by a star coupler having a slab waveguide. Then, the branched lights are outputted from an output port. However, an optical path length required to branch the light at a resolution of about $1/1000$ of a wavelength becomes several ten thousand times of a wavelength of the light propagating through the waveguide. Also, not only the waveguide patterning of the optical circuit, but also the process for installing a wavelength plate and the like to compensate the circuit property depending on a polarized light state is required to be performed (for example, refer to a Non-patent Document 1).

Also, in order to miniaturize the optical circuit, the light is required to be strongly confined in the waveguide. Thus, the optical waveguide is required to have a very great refractive index difference. For example, in the optical waveguide of a conventional step index type, the optical waveguide is designed to have the spatial distribution of the refractive indexes so that a specific refractive index difference has a value greater than 0.1%. When such a great refractive index difference is used to carry out the optical confinement, the degree of freedom of the circuit configuration is limited. In particular, even if the refractive index difference in the optical waveguide is attempted to be attained by using a local UV light irradiation, a thermo-optic effect or an electro-optic effect or the like, the change amount in the obtained refractive index is about 0.1% at most.

Moreover, in a case of changing the propagation direction of the light, when the optical path of the optical waveguide is curved at a small curvature, the propagating light is leaked out from the optical waveguide. Thus, the circuit property is deteriorated such as an increase in a transmission loss and the like. Therefore, in order to change the propagation direction of the light, the orientation must be gradually changed along the optical path of the optical waveguide. Inevitably, the optical circuit length becomes very long. As a result, it is difficult to miniaturize the optical circuit.

Therefore, the optical circuit that is high in efficiency and small in size is attained by using a wave propagation medium which is smaller than the optical circuit using the conventional optical waveguide circuit and holographic circuit and enables the optical signal control of a sufficiently high efficiency under a gradual refractive index distribution, namely, even under a small refractive index difference.

However, in the wave propagation medium, in accordance with the refractive index of each virtual pixel defined by a virtual mesh, an optical signal, while undergoing multiple scattering, is transmitted from the input port to the output port. Thus, a manufacturing error when the mesh-shaped pixel is generated causes the leakage of the transmission light. Consequently, the interference is generated between the propagation light outputted to the output port and the leaked transmission light of the same wavelength, and even if the wavelength is different and the interference is not generated, crosstalk is generated.

Also, the wave propagation medium transmits an optical signal by using the effect of the interference. Thus, a large angle cannot be given to the optical path, and crosstalk is great. Since the effect of the interference is different depending on the angle of the incident light, the fact that the rate for the oblique incident component is high leads to one reason of the deterioration in crosstalk. In particular, in a region where a beam diameter of the light near the input and output ports is small, the rate of the component obliquely incident with respect to the propagation direction of the light is great, which deteriorates the crosstalk. There is a problem that the circuit property is further deteriorated such that the transmission loss of the optical circuit becomes greater because of the deterioration of the crosstalk as mentioned above.

Moreover, the mesh-shaped pixel near the input port and the output port in the wave propagation medium can function as a kind of lens and collect the lights. However, because of the mesh-shaped pixel, there is a problem that the discrimination of a light focusing position is difficult and the connection to a different optical element is difficult.

Non-patent Document 1: Y. Hibino, "Passive Optical Devices for Photonic Networks", IEIC' Trans. Commun., Vol. E83-B No. 10, (2000).

DISCLOSURE OF THE INVENTION

The first object of the present invention is to provide an optical functional circuit in which a holographic wave propagation medium is applied and a circuit property is excellent such as small transmission loss and crosstalk. Also, the second object is to provide an optical functional circuit in which the connection of an optical waveguide device, to which the holographic wave propagation medium is applied, is made easier so that the transmission loss and the crosstalk are small.

In order to attain such objects, the optical functional circuit in which a plurality of circuit elements are formed on a substrate includes a wave propagation medium, which converts an optical path of the leakage light that is not emitted from a predetermined output port of the circuit element so as to prevent the leakage light from being coupled to a different circuit element. This wave propagation medium is constituted by an optical waveguide which is provided with a clad layer formed on the substrate and a core embedded in the clad layer, and a part of the optical waveguide is formed in accordance with a refractive index distribution which is multiple scattered.

Also, in the optical functional circuit including the wave propagation medium, in order that among optical signals made incident from an input port defined in the wave propagation medium, a stray light that is not emitted from a predetermined output port defined in the wave propagation medium is not coupled to a different output port, an optical axis of the input port and an optical axis of the predetermined output port are arranged so as not to be made coincident with each other.

Moreover, on the substrate, positioning markers for defining input and output ports defined in the wave propagation medium are formed. The positioning markers, which are formed on members having optical parts optically coupled to the input and output ports and define light focusing positions of the optical parts, and the positioning markers for defining the ports are aligned, thereby coupling the ports and the optical parts optically.

Furthermore, on the substrate, monitoring waveguides for defining input and output ports defined in the wave propagation medium are formed from an end facet on which the input port is formed to an end facet on which the output port is formed. Optical fibers for positioning, which are formed on members having optical parts optically coupled to the input and output ports and define light focusing positions of the optical parts, and the monitoring waveguides are aligned, thereby coupling the input and output ports and the optical parts optically.

BEST MODE FOR CARRYING OUT THE INVENTION

Embodiments of the present invention will be described below in detail with reference to the drawings. An optical functional circuit in this embodiment is a holographic wave propagation medium defined in a plurality of scattering points and propagates a wave holographically through multiple scattering in accordance with a two-dimensional refractive index distribution.

First, the basic concept of the wave propagation medium used in the present invention is explained. Here, since it is applied to an optical circuit, "wave" propagating through the wave propagation medium is "light." It is noted that the theory related to the wave propagation medium indicates the property of a medium in accordance with a typical wave equation and can be established in principle even in the typical wave. In the wave propagation medium, in order to input a coherent light pattern and output a desirable light pattern, the refractive index distribution is determined such that a phase difference between a forward propagation light and a backward propagation light which propagates through the wave propagation medium becomes small even at any position in the wave propagation medium. The desirable light pattern is outputted by the multiplex repetition of a holographic control at a local level in accordance with the refractive index distribution.

Figure 1A:
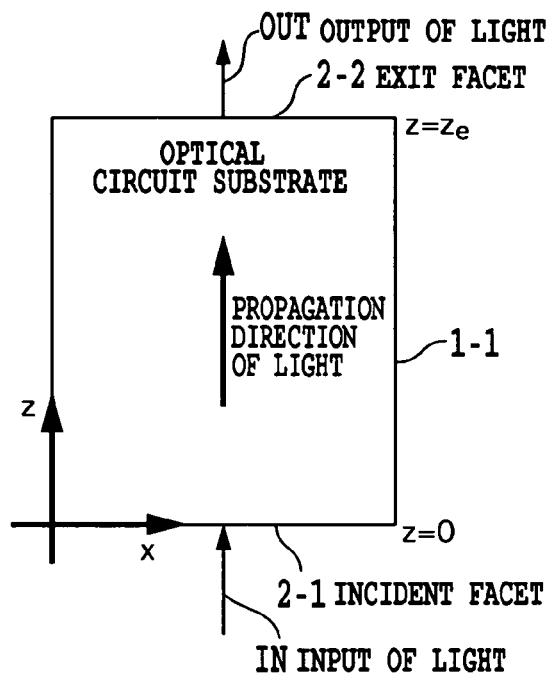
FIG. 1A is a view explaining a basic structure of a wave propagation medium.
Figures 1B, 1C:
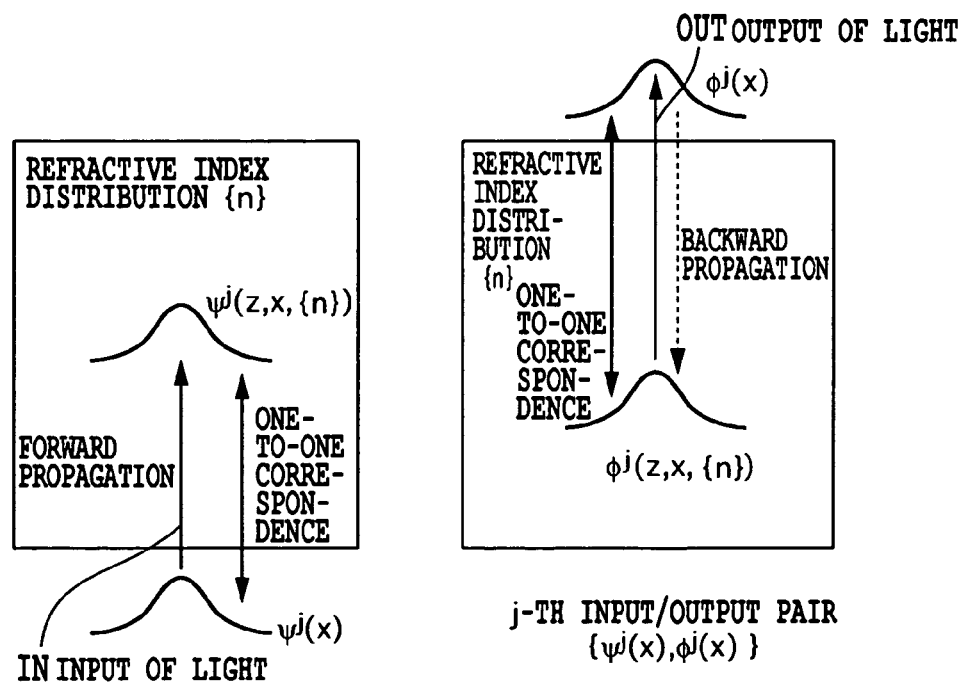
FIG. 1B is a view explaining a basic structure of a wave propagation medium.
FIG. 1C is a view explaining a basic structure of a wave propagation medium.

The basic structure of the wave propagation medium according to this embodiment is explained with reference to FIGS. 1A to 1C. As shown in FIG. 1A, in an optical circuit substrate 1, there is a design region 1-1 of an optical circuit constituted by the wave propagation medium. One end facet of the optical circuit is an incidence facet 2-1 to which an input light IN is incident. The input light IN propagates while undergoing multiple scattering inside the optical circuit, which is constituted by the wave propagation medium and has a spatial refractive index distribution, and outputted as an output light OUT from an exit facet 2-2 serving as the other end facet. A coordinate z in FIG. 1A is a coordinate (z=0 is an incidence facet, and $z=z_e$ is an exit facet) in the propagation direction of the light, and a coordinate x is a coordinate in a lateral direction relative to the propagation direction of the light. It is noted that, in this embodiment, the wave propagation medium is assumed to be made of dielectric material, and the spatial refractive index distribution is attained by setting a local refractive index of the dielectric material constituting the wave propagation medium in accordance with a theory which will be described later.

"Field" (input field) formed by the input light IN is modulated in accordance with the spatial distribution of the refractive indexes of the wave propagation medium constituting the optical circuit and converted into "field" (output field) formed by the output light OUT. In other words, the wave propagation medium of the present invention is the (electromagnetic) field converting means for relating the input field and the output field in accordance with the spatial refractive index distribution. It is noted that, with regard to the input field and output field, the field of the light in a section (the section along the x-axis in the drawing) vertical to the propagation direction (the z-axis direction in the drawing) in the optical circuit is referred to as a (forward) propagation image (a propagation field or propagation light) in that position (x, z) (refer to FIG. 1B).

Here, "field" typically implies an electromagnetic field or a vector potential of the electromagnetic field. The control of the electromagnetic field in this embodiment corresponds to the change of the spatial refractive index distribution installed in the optical circuit, namely, the distribution of a dielectric constant. Although the dielectric constant is given as a tensor, usually, the transition between the polarized light states is not great. Thus, even if only one component in the electromagnetic field is targeted and a scalar wave approximation is performed, an excellent approximation is attained. Therefore, in this specification, the electromagnetic field is treated as a complex scalar wave. It is noted that, in "state" of the light, there are an energy state (wavelength) and a polarized light state. Hence, when "field" is treated as the representation of the state of the light, the wavelength of the light and the polarized light state can be contained.

Also, usually, in the optical circuit for preventing the amplification and attenuation of the propagation light, when the spatial distribution of the refractive indexes is determined, the image (the input field) of the input light IN other than a focal point is determined uniquely for the image (the output field) of the output light OUT. The field of the light propagating to the side of the incidence facet 2-1 from the side of the exit facet 2-2 as mentioned above is referred to as a backward propagation image (a backward propagation field or backward propagation light) (refer to FIG. 1C). The backward propagation image as mentioned above can be defined for each position in the optical circuit. That is, when the field of the light at any position in the optical circuit is considered, if the position is considered as the exit point of a virtual "input light," similarly to the above-mentioned case, the backward propagation image at the position can be considered for the image of the output light OUT. In this way, the backward propagation image can be defined for each position in the optical circuit.

In particular, in the single optical circuit, when the exit field is defined as the propagation field of the incidence field, the propagation field and the backward propagation field are coincident at any point in the optical circuit. It is noted that the field is the function on the targeted entire space. However, in the case of "incidence field" or "exit field," this implies the section of the field on the incidence facet or exit facet. Also, in the case of "field distribution," when a discussion is carried out with regard to a certain particular section, this implies the section of the field of the section concerned.

In order to explain a determining method of the refractive index distribution, the use of symbols is preferable in understanding. Thus, in order to represent the respective amounts, the following symbols are used. It is noted that the targeted light (field) is not limited to the light in a single state. Hence, in order to be able to target the light where the lights in a plurality of states are superimposed, an index j is given to the light in the individual state, and they are typically represented.

· $\phi^j(x)$: j-th incidence field (this is a complex vector value function and defined in accordance with the intensity distribution and phase distribution set on the incidence facet, and the wavelength and polarized wave).

· $\psi^j(x)$: j-th exit field (this is a complex vector value function and defined in accordance with the intensity distribution and phase distribution set on the exit facet, and the wavelength and polarized wave). It is noted that, with regard to $\phi^j(x)$ and $\psi^j(x)$, unless an intensity amplification, a wavelength conversion and a polarized wave conversion are carried out in the circuit, the sum of the optical intensities are same (or the loss of an ignorable level), and their wavelengths and polarized waves are equal.

· $\{\phi^j(x), \psi^j(x)\}$: input output pair (a set of a field of the input and output). $\{\phi^j(x), \psi^j(x)\}$ is defined in accordance with the intensity distribution and phase distribution on the incidence facet and exit facet, and the wavelength and polarized wave.

· $\{n_q\}$: refractive index distribution (a set of values in an entire optical circuit design region). When one refractive index distribution is given to the given incidence field and exit field, the field of the light is determined. Thus, it is necessary to consider the field for the entire refractive index distribution given by the q-th repetitive calculation. Therefore, assuming that (x, z) is an uncertain variable, the entire refractive index distribution may be represented as $n_q(x, z)$. However, in order to distinguish from a value $n_q(x, z)$ at a position (x, z), $\{n_q\}$ is represented for the entire refractive index distribution.

· $n_{core}$: a symbol indicating a value of a high refractive index for a peripheral refractive index, such as a core portion in the optical waveguide.

· $n_{clad}$: a symbol indicating a value of a low refractive index for $n_{core}$, such as a clad portion in the optical waveguide.

· $\phi^j(z,x,\{n_q\})$: a value of a field at the position (x, z) when the j-th incidence field $\phi^j(x)$ is propagated until z in the refractive index distribution $\{n_q\}$.

· $\psi^j(z,x,\{n_q\})$: a value of a field at the position (x, z) when the j-th exit field $\psi^j(x)$ is backwardly propagated until z in the refractive index distribution $\{n_q\}$.

In this embodiment, $\{n_q\}$ is given such that the refractive index distribution becomes $\phi^j(z_e,x,\{n_q\})=\psi^j(x)$ or the state close thereto, for all j.

"Input port" and "output port" are "regions" where the fields on the incidence facet and the exit facet are concentrated. For example, this is the region where the optical intensity can be propagated to a fiber by an optical fiber to the portion. Here, the intensity distribution and phase distribution of the field can be designed so as to be different between the j-th field and the k-th field. Thus, a plurality of ports can be installed on the incidence facet and the exit facet. Moreover, when the set of the incidence field and the exit field is considered, the phase generated by the propagation between them is different depending on the frequency of the light. Hence, the light whose frequency is different (namely, the light whose wavelength is different) can be set as the different port, regardless of whether or not the field shape including the phase is equal or orthogonal.

Here, the electromagnetic field has the wavelength and the polarized light state as the parameters, in the field of a real number vector value. However, the value of the component is indicated by using a complex number which is easy in typical mathematic treatment, and the solution of the electromagnetic wave is represented. Also, in the following calculation, it is assumed that the intensity of the entire field is ruled as 1. As shown in FIG. 1B and FIG. 1C, with regard to the j-th incidence field $\phi^j(x)$ and exit field $\phi^j(x)$, the propagation field and backward propagation field are assumed to be the complex vector value functions at respective positions and represented as $\phi^j(z,x,\{n\})$ and $\psi^j(z,x,\{n\})$. Since the values of those functions are changed in accordance with the refractive index distribution $\{n\}$, the refractive index distribution $\{n\}$ becomes the parameter. From the definition of the symbols, $\phi^j(x)=\phi^j(0,x,\{n\})$ and $\psi^j(x)=\psi^j(z_e,x,x\{n\})$. The values of those functions can be easily calculated by the known method such as a beam propagation method and the like, if the incidence field $\phi^j(x)$, the exit field $\psi^j(x)$ and the refractive index distribution $\{n\}$ are given.

Figure 2:
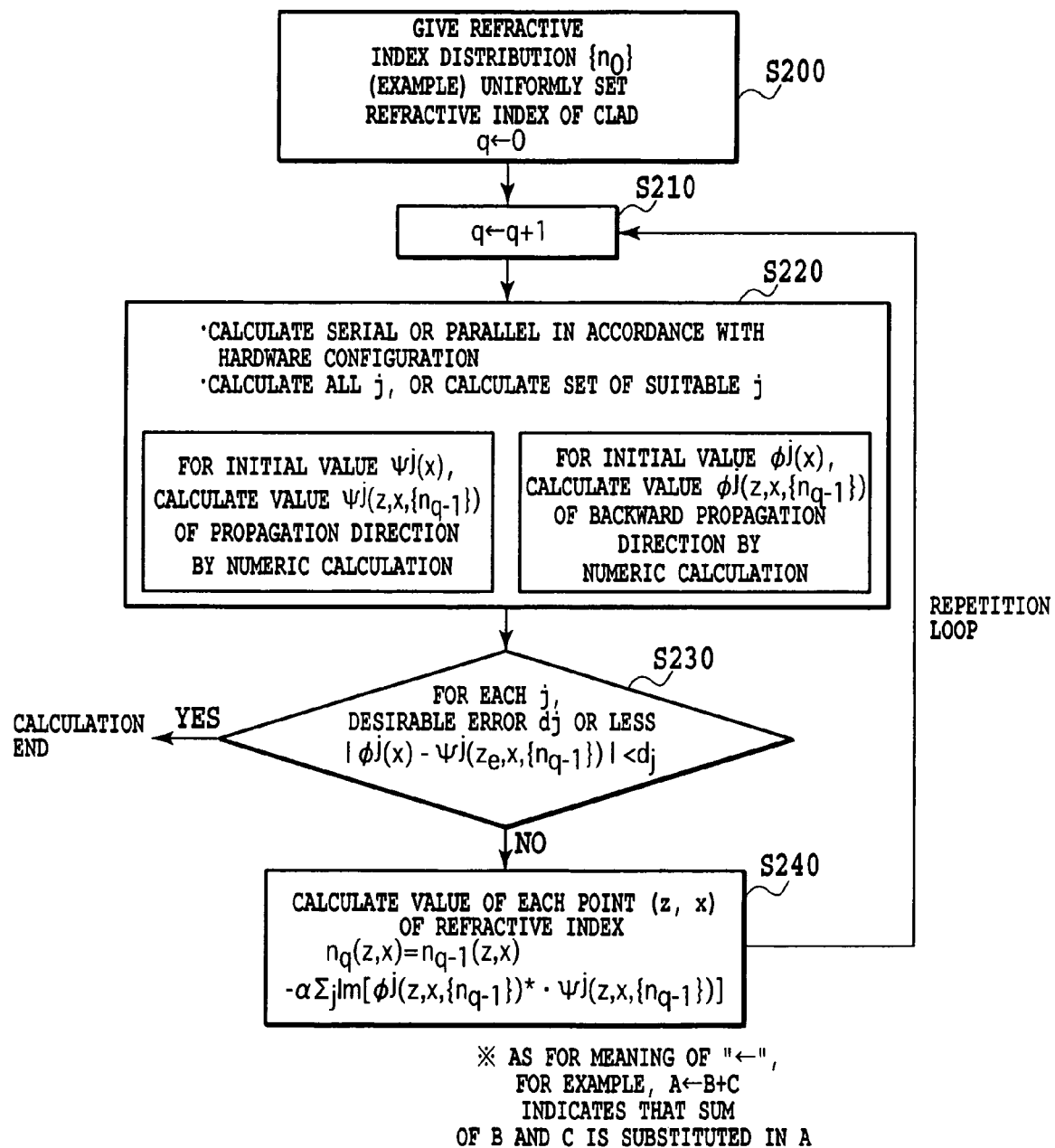
FIG. 2 is a flowchart showing a calculation procedure for determining a spatial refractive index distribution of the wave propagation medium.

A typical algorithm for determining the spatial refractive index distribution will be explained below. FIG. 2 shows a calculation procedure for determining the spatial refractive index distribution of the wave propagation medium. This calculation is repeatedly executed. Then, the number of the repetitions is represented by q. When the calculation is executed until the (q−1)-th calculation, the (q−1)-th calculation is illustrated. In accordance with a refractive index distribution $\{n_{q-1}\}$ obtained by the (q−1)-th calculation, with regard to each j-th incidence field $\phi^j(x)$ and exit field $\psi^j(x)$, the propagation field and the backward propagation field are calculated by a numerical calculation, and the results are represented as $\phi^j(z,x,\{n_{q-1}\})$ and $\psi^j(z,x,\{n_{q-1}\})$ respectively (step S220).

In accordance with those results, a refractive index $n_q(z,x)$ at each position (x, z) is calculated by the following equation (step S240).

$$n_q(z,x)=n_{q-1}(z,x)-\alpha\Sigma_j Im[\phi^j(z,x,\{n_{q-1}\})^*\cdot\psi^j(z,x,\{n_{q-1}\})] \quad (1)$$

Here, the symbol [·] in the second term on the right-hand side implies the inner product calculation, and Im[ ] implies the imaginary component of the field inner product calculation result in [ ]. It is noted that the symbol [*] is the complex conjugate. The coefficient α is the value after the value equal to or less than the fraction of $n_q(z,x)$ is further divided by the number of the field sets, and this is the positive small value. The $\Sigma_j$ implies the summing of the indexes j.

When the steps S220 and S240 are repeated, if an absolute value of a difference between the value $\phi^j(z_e,x,\{n\})$ on the exit facet of the propagation field and the exit field $\psi^j(x)$ becomes smaller than a desirable error $d_j$ (step S230: YES), the calculation is ended.

In the above-mentioned calculations, the initial value $\{n_0\}$ of the refractive index distribution may be suitably set. However, as this initial value $\{n_0\}$ is closer to an expected refractive index distribution, the convergence of the calculation becomes accordingly quick (step S200). Also, when $\phi^j(z,x,\{n_{q-1}\})$ and $\psi^j(z,x,\{n_{q-1}\})$ are calculated for each j, in a case of a computer in which parallel calculations are possible, they may be calculated for each j (namely, for each $\phi^j(z,x,\{n_{q-1}\})$ and $\psi^j(z,x,\{n_{q-1}\})$), a cluster system and the like can be used to make the efficiency of the calculation higher (step S220). Also, if the computer is constituted by a relatively small memory, in the summing portion about the indexes j in the equation (1), the suitable j is selected with regard to each q, and only the $\phi^j(z,x,\{n_{q-1}\})$ and $\psi^j(z,x,\{n_{q-1}\})$, which correspond to it, can be calculated to repeat the calculations thereafter (step S220).

In the above-mentioned calculations, if the value of $\phi^j(z,x,\{n_{q-1}\})$ and the value of $\psi^j(z,x,\{n_{q-1}\})$ are close, Im[$\phi^j(z,x,\{n_{q-1}\})^*\cdot\psi^j(z,x,\{n_{q-1}\})$] in the equation (1) becomes the value corresponding to the phase difference. Then, reducing this value can obtain a desirable output.

The determination of the refractive index distribution can be expressed in a different word such as an operation for determining a virtual mesh for the wave propagation medium and determining a refractive index of a micro region (a pixel) defined by this mesh for each pixel. Such a local refractive index can be any (desirable) value for each position, in principle. The simplest system is the system provided only with a pixel having a low refractive index $\{n_L\}$ and a high refractive index $\{n_H\}$, and the entire refractive index distribution can be determined by the spatial distribution of the two kinds of the pixels. In this case, the position in which the low refractive index pixel in the medium exists can be regarded as the gap of the high refractive index pixel. Reversely, the position in which the high refractive index pixel exists can be regarded as the gap of the low refractive index pixel. That is, the wave propagation medium of the present invention can be represented such that the desirable position (pixel) in the medium having a uniform refractive index is replaced by the pixel of the refractive index different from this.

The calculation content for the refractive index distribution determination as mentioned above is summed as follows. An input port and an output port are installed in the medium (the dielectric material in the case of the light) through which the wave can be transferred holographically. Then, a field distribution 1 (a forward propagation light) of the transmission light incident from the input port and a field distribution 2 (a backward propagation light) of a phase conjugate light where the output field expected when an optical signal incident from the input port is outputted from the output port is backwardly propagated from the output port side are determined by the numerical calculation. With regard to the field distribution 1 and the field distribution 2, the spatial refractive index distribution in the medium is determined so as to eliminate the phase difference at each position (x, z) of the transmission light and the backward propagation light. It is noted that, when the steepest descent method is employed as the method of obtaining such a refractive index distribution, by using the refractive index at each point as a variable and changing the refractive index to a direction obtained by the steepest descent method and consequently changing the refractive index as indicated in the equation (1), it is possible to decrease the difference between the two fields. When such a wave propagation medium is applied to the optical part for emitting the light incident from the input port to the desirable output port, the interference phenomenon caused by the multiple scattering between the propagation waves generated in the medium makes the effective optical path length longer. Thus, it is possible to constitute the optical circuit having the optical signal control property which is sufficiently high even in the gradual refractive index change (distribution).

Figure 3:
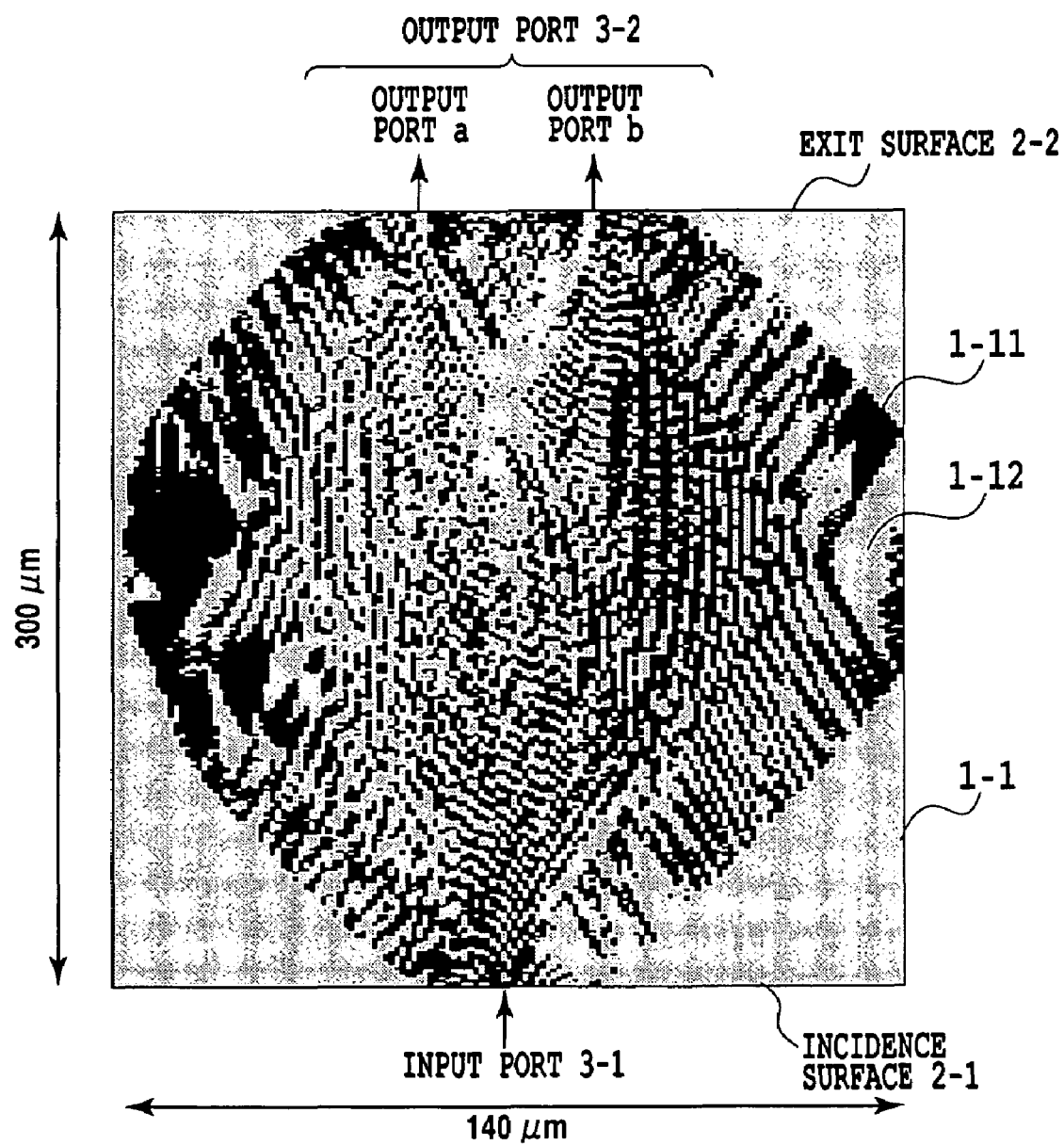
FIG. 3 is a view showing an optical combining/splitting circuit according to an embodiment of the present invention.
Figure 4:
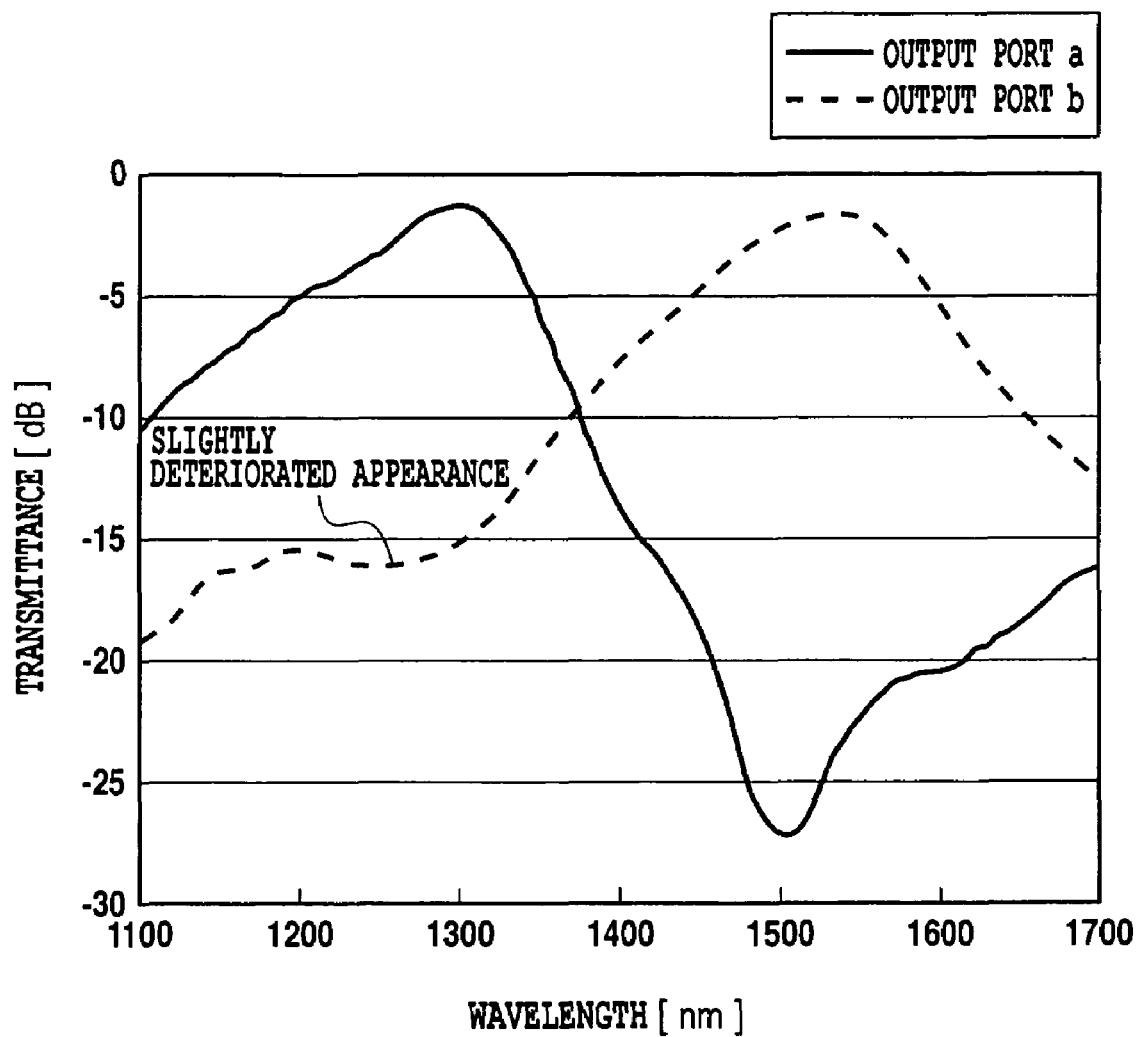
FIG. 4 is a view showing a transmission spectrum of the optical combining/splitting circuit.

FIG. 3 shows an optical combining/splitting circuit according to an embodiment of the present invention. In accordance with the above-mentioned algorithm, the repetition of about 200 times results in a 1×2 optical combining/splitting circuit having the refractive index distribution shown in FIG. 3. Here, a black portion inside an optical circuit design region 1-1 in the drawing is a high refractive index portion (a dielectric material multiple scattering portion) 1-11 corresponding to a core, and the portion except the black portion is a low refractive index portion 1-12 corresponding to a clad, and this is a scattering point which is lower in the refractive index than the waveguide. The refractive index of the clad is assumed to be the refractive index of a quartz glass, and the refractive index of the core has the value where a specific refractive index to the quartz glass is higher by 1.5%. The size of the optical circuit is 300 μm in length and 140 μm in width. The mesh used for the calculation when the refractive index distribution is determined is 300×140. FIG. 4 shows a transmission spectrum of the optical combining/splitting circuit. From the transmission spectrum, it is found that an optical combining/splitting device in accordance with a wavelength is formed.

FIRST EMBODIMENT

As mentioned above, the holographic wave propagation medium can emit the light incident from the input port to the desirable output port. Therefore, in the optical functional circuit where a plurality of circuit elements are formed on the substrate, as the optical part for removing the light leaked from each of the circuit elements (hereinafter, referred to as the leakage light), namely, the light which is not emitted from the predetermined output port of the circuit element, the holographic wave propagation medium is used.

Figure 5:
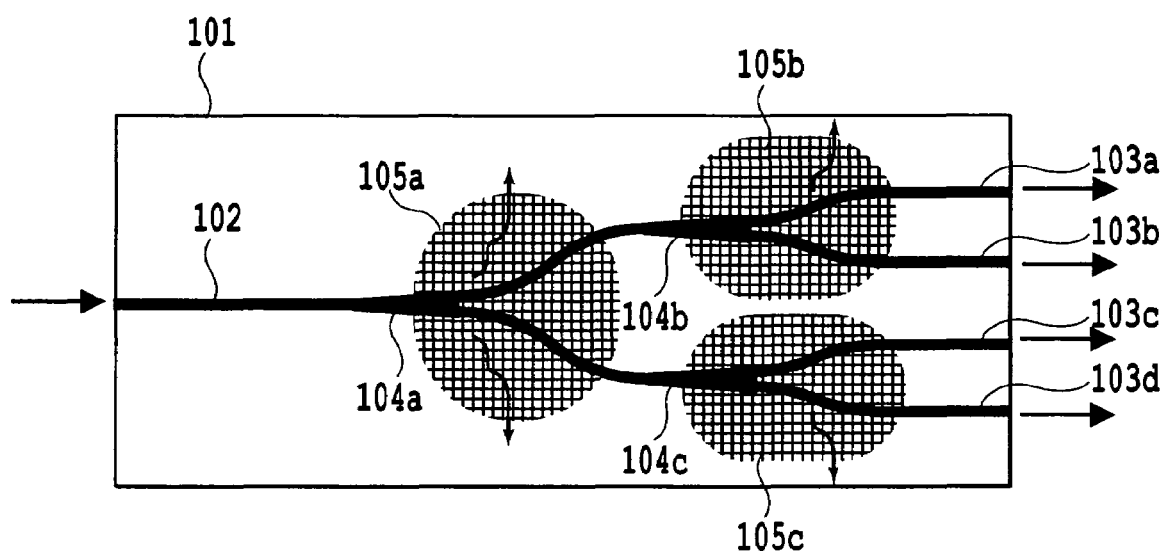
FIG. 5 is a view showing a removing method of a leakage light in an optical branching circuit.

FIG. 5 shows a removing method of the leakage light in the optical branching circuit. A 1×4 optical branching circuit is composed of a waveguide type branching circuit on a substrate 101. Then, the light made incident from an input waveguide 102 is transmitted through three branching waveguides 104a to 104c and emitted from four output waveguides 103a to 103d. At this time, the axis displacement and mode mismatch of the optical fiber, which is optically coupled to an input/output waveguide, cause the leakage light to be generated inside the 1×4 optical branching circuit 101. Also, a radiation light or evanescent light generated in the branching waveguide 104a becomes the leakage light and is re-coupled to the branching waveguides 104b and 104c and the output waveguides 103a to 103d, and then deteriorates the uniformity of the output power of the branch light. Similarly, the radiation lights or evanescent lights generated in the branching waveguides 104b and 104c become the leakage lights and are re-coupled to the output waveguides 103a to 103d, and then deteriorate the uniformity of the output power of the branch light.

Therefore, in order to prevent the leakage lights generated in the branching waveguides 104a to 104c from being re-coupled to the waveguides, stray light guides 105a to 105c are installed. The stray light guides 105a to 105c are the above-mentioned wave propagation mediums and arranged in the finite regions of the clad portion in the substrate 101. The leakage lights generated in the branching waveguides 104a to 104c are emitted to the side, in which the input/output waveguides of the substrate 101 are not formed, by the stray light guides 105a to 105c.

Figure 6:
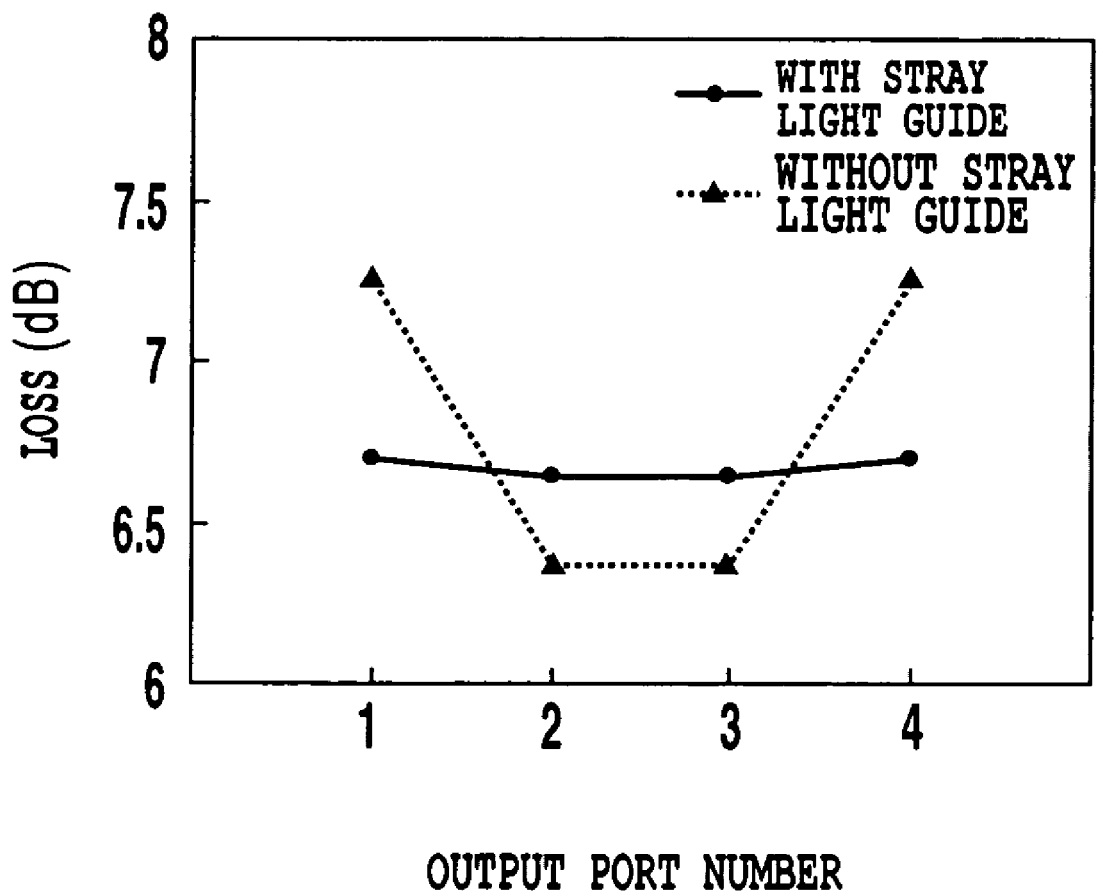
FIG. 6 is a view showing an insertion loss of the optical branching circuit to which the removing method of the leakage light according to a first embodiment is applied.

FIG. 6 shows an insertion loss of the 1×4 optical branching circuit. This shows the insertion loss between the input waveguide and each output waveguide, when the light of a wavelength 1.55 μm is made incident. The variation in the insertion loss when the stray light guides 105a to 105c are present is 0.1 dB, and the variation in the insertion loss when there is no stray light guide is 1 dB. It is found that the leakage light is removed by the stray light guide using the wave propagation medium.

SECOND EMBODIMENT

Figure 7:
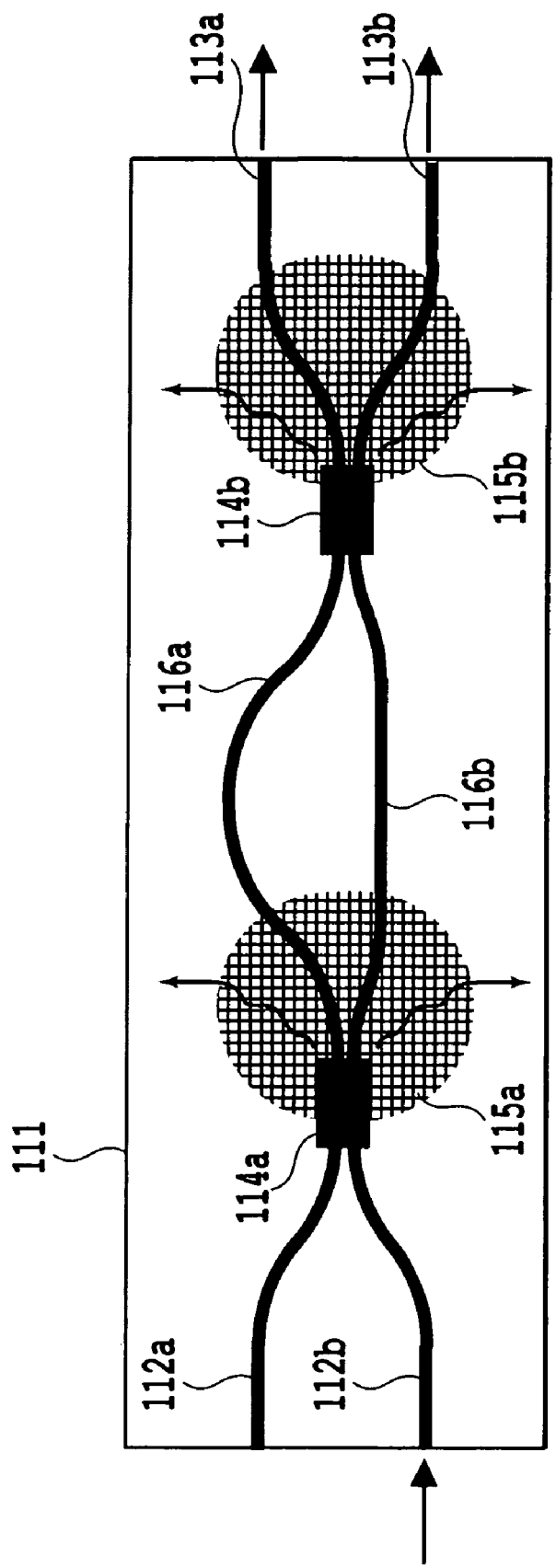
FIG. 7 is a view showing a removing method of a leakage light in an MZ-type optical combining/splitting circuit.

FIG. 7 shows a removing method of a leakage light in the MZ-type optical combining/splitting circuit. The MZ-type optical combining/splitting circuit is provided with an optical coupler 114a coupled to input waveguides 112a and 112b, an optical coupler 114b coupled to output waveguides 113a and 113b, and arm waveguides 116a and 116b for coupling the optical coupler 114a and the optical coupler 114b. Similarly to the first embodiment, the axis displacement and mode mismatch of the optical fibers optically coupled to the input/output waveguides cause the leakage light to be generated inside the MZ-type optical combining/splitting circuit. Also, the radiation lights or evanescent lights generated in the optical couplers 114a and 114b become the leakage lights and are re-coupled to the arm waveguides 116a and 116b and the output waveguides 113a and 113b, and then deteriorate the crosstalk.

Therefore, in order to prevent the leakage lights generated in the optical coupler 114a and 114b from being re-coupled to the optical waveguides, stray light guides 115a and 115b are installed. The stray light guides 115a and 115b are the above-mentioned wave propagation mediums and arranged in the finite regions of the clad portion in a substrate 111. The leakage lights generated in the optical couplers 114a and 114b are emitted to the side, in which the input/output waveguides of the substrate 111 are not formed, by the stray light guides 115a and 115b.

Figure 8B:
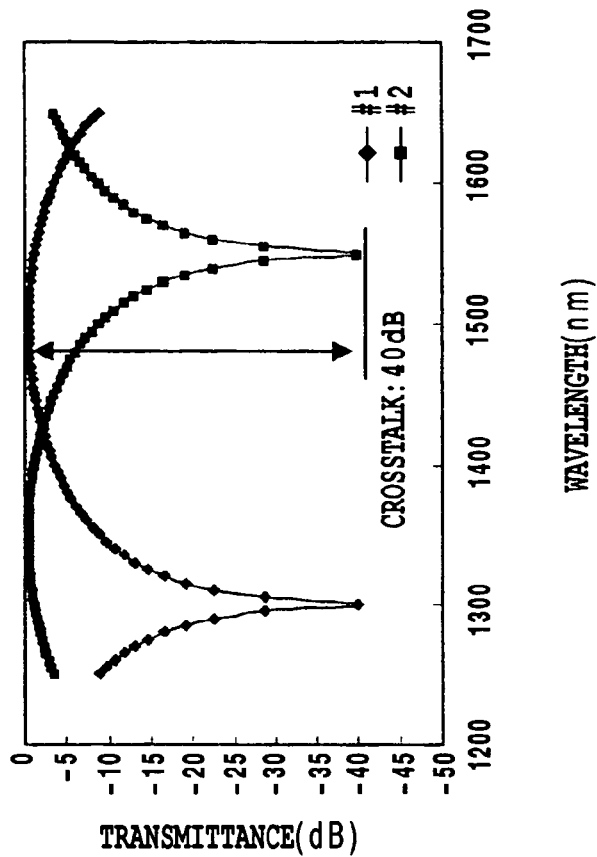
FIG. 8B is a view of a transmission spectrum of an MZ-type optical combining/splitting circuit to which a removing method of a leakage light according to a second embodiment is applied.
Figure 8A:
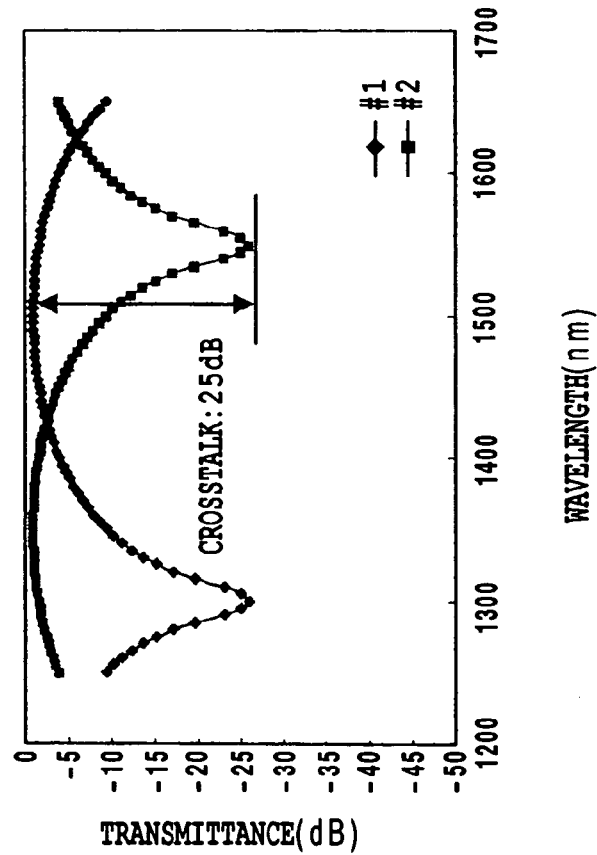
FIG. 8A is a view showing a transmission spectrum of the MZ-type optical combining/splitting circuit without any stray light guide.

FIGS. 8A and 8B show the transmission spectrum of the MZ-type optical combining/splitting circuit. FIG. 8A shows the transmission spectrum of the MZ-type optical combining/splitting circuit without any stray light guide, and the crosstalk is 25 dB. FIG. 8B shows the transmission spectrum of the MZ-type optical combining/splitting circuit to which the removing method of the leakage light according to the second embodiment is applied, and the crosstalk is 40 dB. It is found that the leakage light is removed by the stray light guides 115a and 115b using the wave propagation medium.

In the first and second embodiments, since the holographic wave propagation medium is applied as the optical part for removing the leakage light, in the conventional optical circuit, it is possible to attain an optical functional circuit having excellent circuit property where the interference is not generated between the plurality of output ports, and the transmission loss and the crosstalk are small.

THIRD EMBODIMENT

With reference to the transmission spectrum of the optical combining/splitting circuit shown in FIG. 4, it is found that a part of the transmission light to be emitted to an output port b is emitted to an output port a. This is because with a manufacturing error when the wave propagation medium having the shape of the mesh is manufactured, a part of the light to be transmitted through the wave propagation medium is not outputted to a predetermined output port but emitted to a different output port or leaked from the portion other than the output port. In this way, among the light signals made incident from the input port, the light that is not emitted from the predetermined output port, namely, the transmission light that does not contribute to the circuit operation assumed on the design or obstructs the circuit operation is hereinafter referred to as "stray light." As shown in FIG. 4, it is found that the transmission light to be emitted to the output port b is emitted as the stray light to the output port a.

Figure 9:
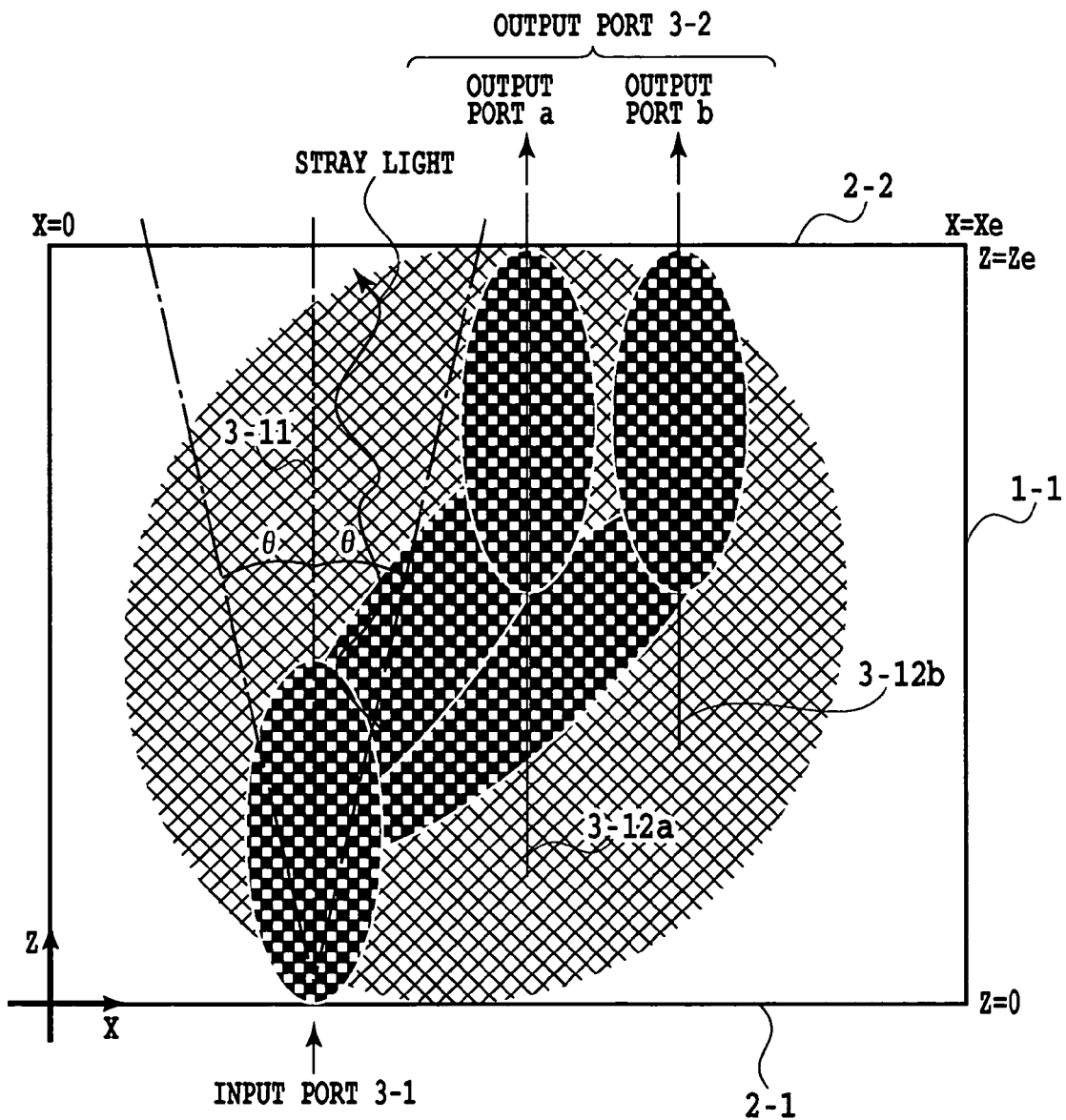
FIG. 9 is a view showing a removing method of a stray light according to a third embodiment of the present invention.

The removing method of this stray light will be described below in detail by exemplifying the optical combining/splitting circuit shown in FIG. 3. FIG. 9 shows the removing method of the stray light according to the third embodiment of the present invention. With respect to an optical axis 3-11 on an input port 3-1 in the optical combining/splitting circuit, optical axes 3-12a and b of an output port 3-2 are shifted in a lateral direction on a coordinate x. Specifically with reference to FIG. 9, it is assumed to be a half value θ of a beam divergence angle of the incident light from the input port 3-1. The output port 3-2 may be arranged outside the intersection of the exit facet 2-2 and two lines of an angle θ from the input port 3-1 with respect to the optical axis 3-11 of the input port 3-1.

That is, the transmission light components that do not contribute to the circuit operation assumed on the design are scattered by the pixels whose refractive indexes are different. However, the whole thereof is substantially straightly advanced. Thus, only by shifting and setting the optical axes 3-12a and b of the output port 3-2 with respect to the optical axis 3-11 of the input port 3-1, there is a certain effect of removing the stray light.

Figure 10:
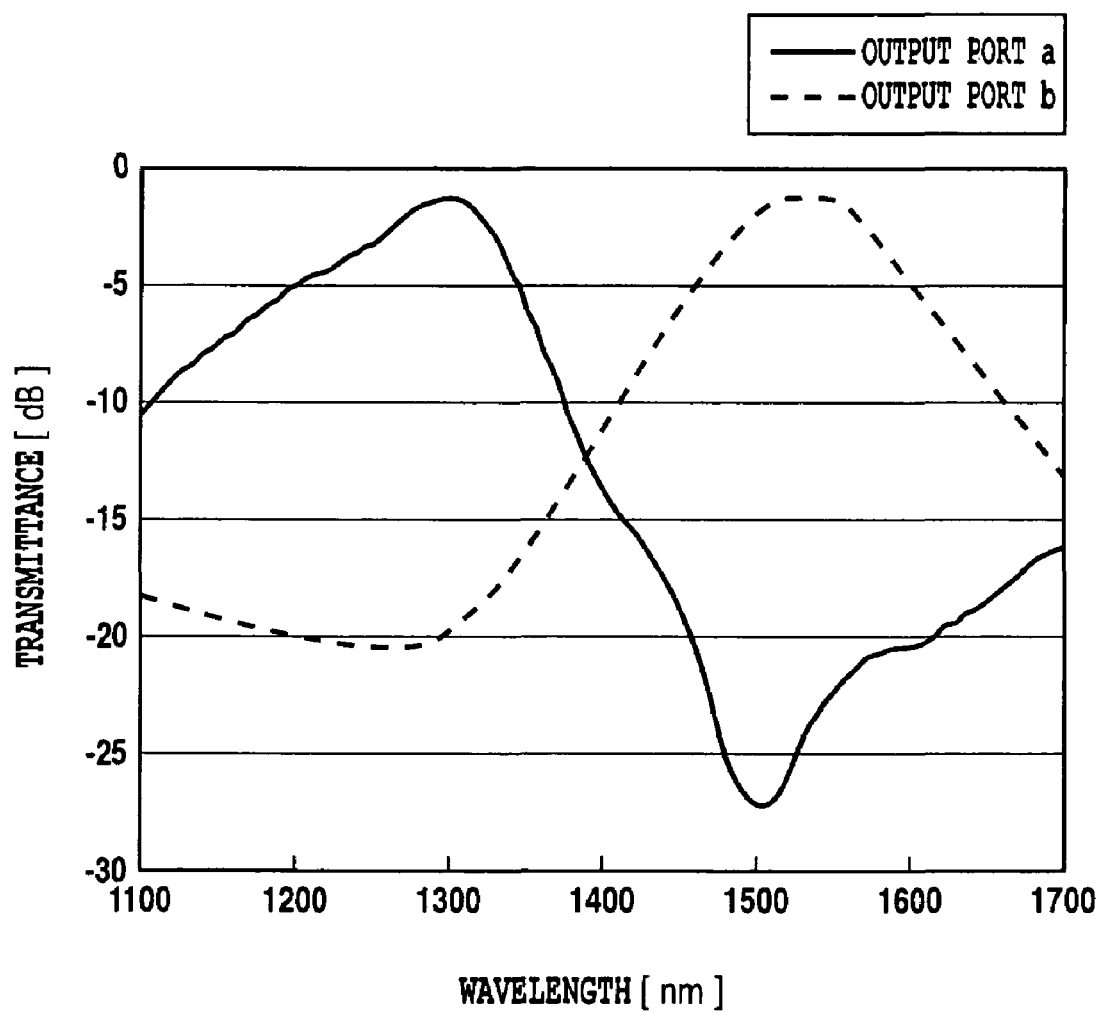
FIG. 10 is a view showing a transmission spectrum of an optical combining/splitting circuit according to the third embodiment.

FIG. 10 shows the transmission spectrum of the optical combining/splitting circuit according to the third embodiment. As compared with the spectrum shown in FIG. 4, it is found that the stray light that has been emitted to the output port a is suppressed. In this way, by application of the holographic wave propagation medium, miniaturization can be attained and it is possible to attain the optical functional circuit having the excellent circuit property where the interference is not generated between the plurality of output ports, and the transmission loss and the crosstalk are small.

FOURTH EMBODIMENT

Figure 11:
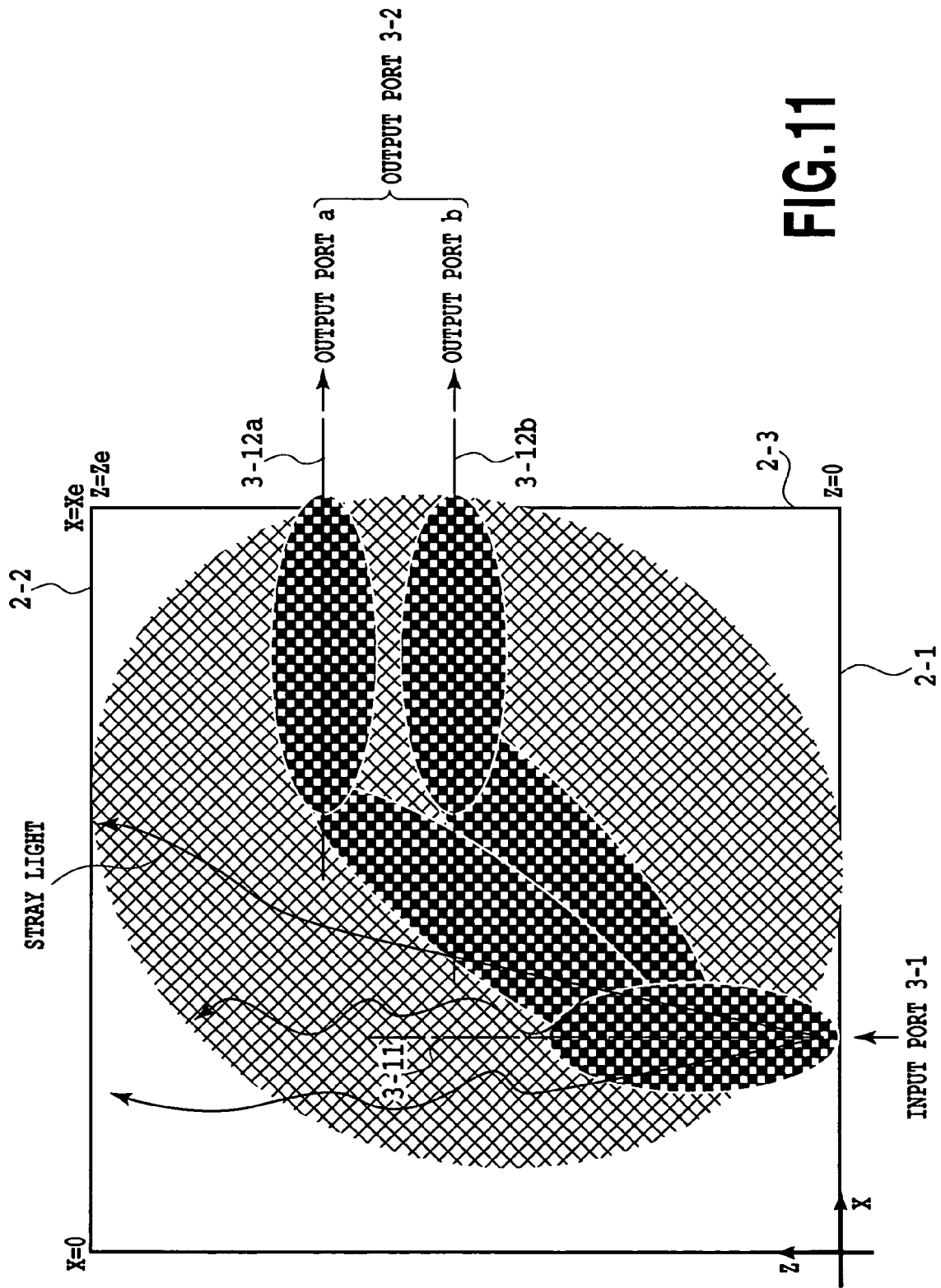
FIG. 11 is a view showing a removing method of a stray light according to a fourth embodiment of the present invention.

FIG. 11 shows a removing method of the stray light according to the fourth embodiment of the present invention. Similarly to the third embodiment, the optical axes 3-12a and b of the output port 3-2 are shifted with respect to the optical axis 3-11 of the input port 3-1. In the fourth embodiment, the output port 3-2 is set for an exit facet 2-3 on $x=x_e$, and an angle between the optical axis 3-11 and the optical axes 3-12a and b are square.

At this time, the calculation for calculating the refractive index distribution may be calculated along the straight line to connect the input port 3-1 and the output port 3-2. In this case, the input field and the output field are inclined and given.

FIFTH EMBODIMENT

Figure 12:
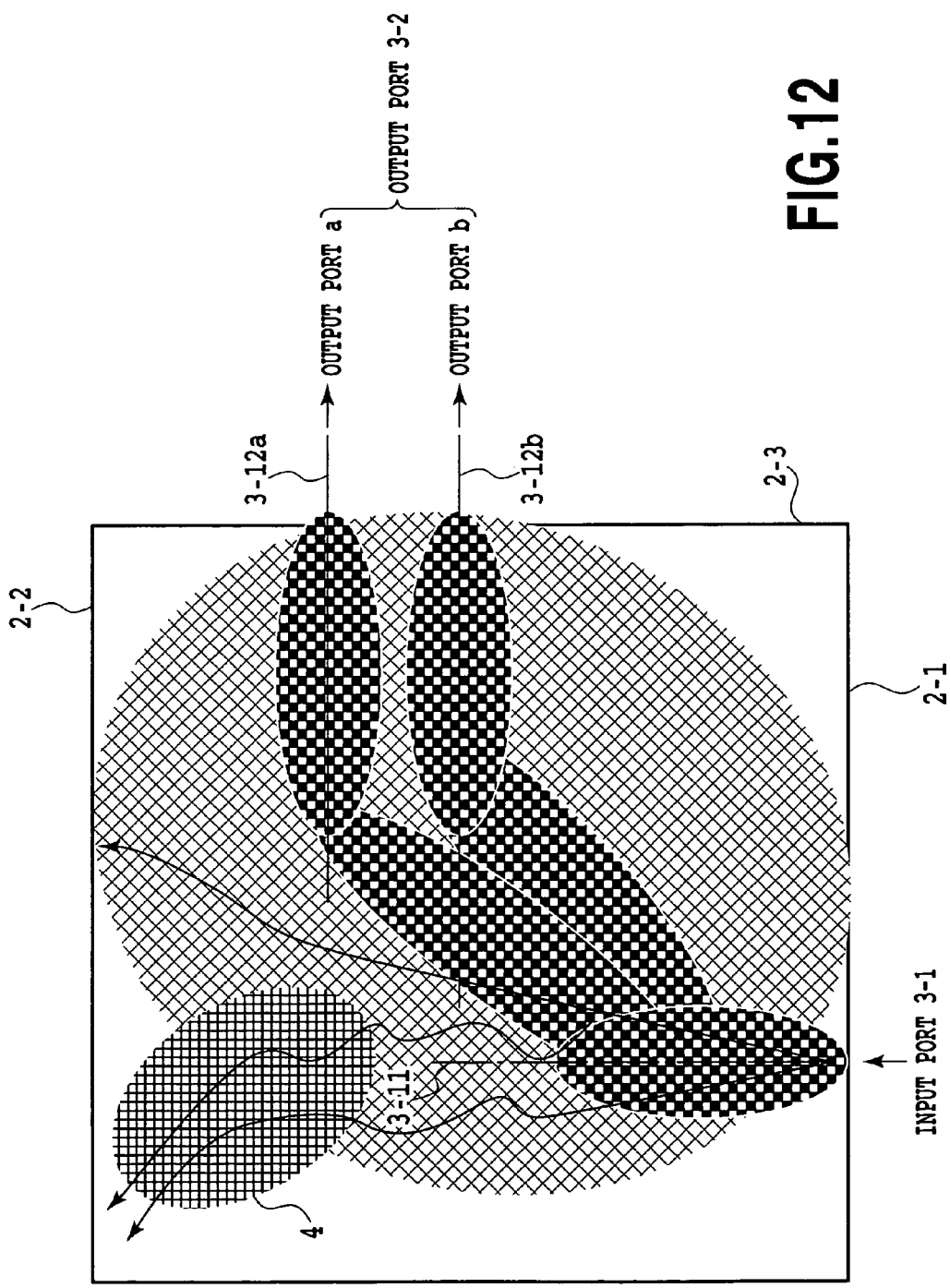
FIG. 12 is a view showing a removing method of a stray light according to a fifth embodiment of the present invention.

FIG. 12 shows a removing method of the stray light according to the fifth embodiment of the present invention. In addition to the configuration of the fourth embodiment, a stray light guide 4 is arranged. In the fourth embodiment, along the optical axis 3-11 of the input port, the stray light is considered to be outputted in the direction of the exit facet 2-2. Therefore, the stray light guide 4 is arranged such that the stray lights around the optical axis 3-11 can be collected and collectively outputted to the left end of the exit facet 2-2.

In the calculation for calculating the refractive index distribution of the stray light guide 4, the input end facet of the stray light guide is suitably determined to determine the stray light field on the input end facet. Next, along the axis based on the input end facet, the calculation is carried out in accordance with the above-mentioned algorithm.

SIXTH EMBODIMENT

Figure 13:
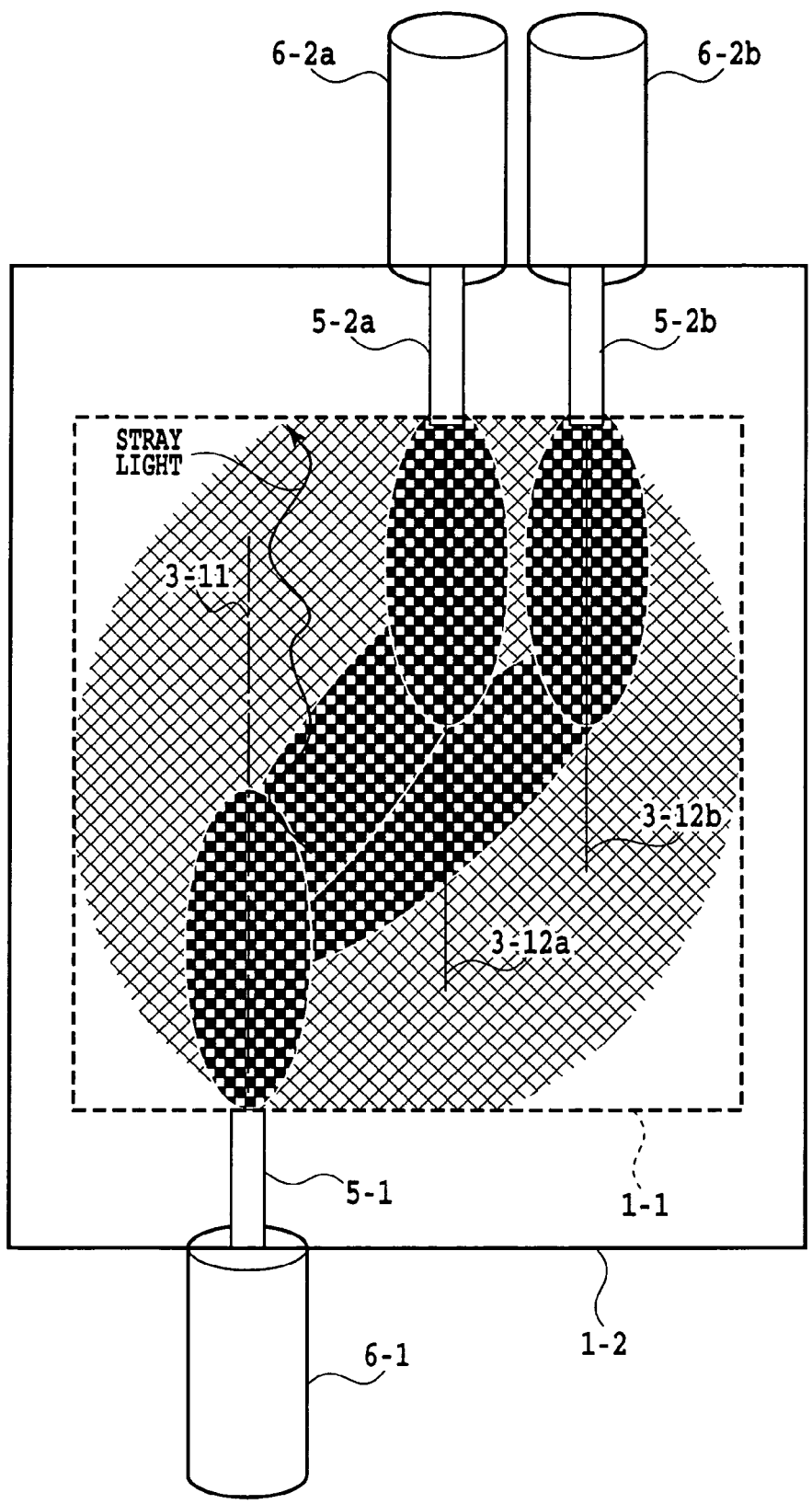
FIG. 13 is a view showing a removing method of a stray light according to a sixth embodiment of the present invention.

FIG. 13 shows a removing method of the stray light according to the sixth embodiment of the present invention. In addition to the configuration of the third embodiment, an input waveguide 5-1 and output waveguides 5-2a and b are arranged. In the optical circuit shown in FIG. 9, the input port 3-1 and output port 3-2 of the wave propagation medium formed inside the optical circuit design region 1-1 do not have any structural boundary. Thus, the connection to the optical fiber is difficult.

Therefore, the waveguide 5-1 connected to the input port and the waveguides 5-2a and b connected to the output port are formed on a substrate 1-2 around the optical circuit design region 1-1. The optical waveguides 5-1 and 5-2 are the straight waveguides composed of core portions and clad portions around the core portions and have the structural boundaries. Thus, the connections to optical fibers 6-1 and 6-2 are easy.

It is noted that, in the sixth embodiment, the straight waveguide is described, however, the optical waveguide has flexibility in layout, and a curved waveguide is also possible. Thus, the degree of freedom of the positional relationship between the input port and the output port of the optical circuit design region 1-1 and the optical fiber is increased.

SEVENTH EMBODIMENT

Figure 14:
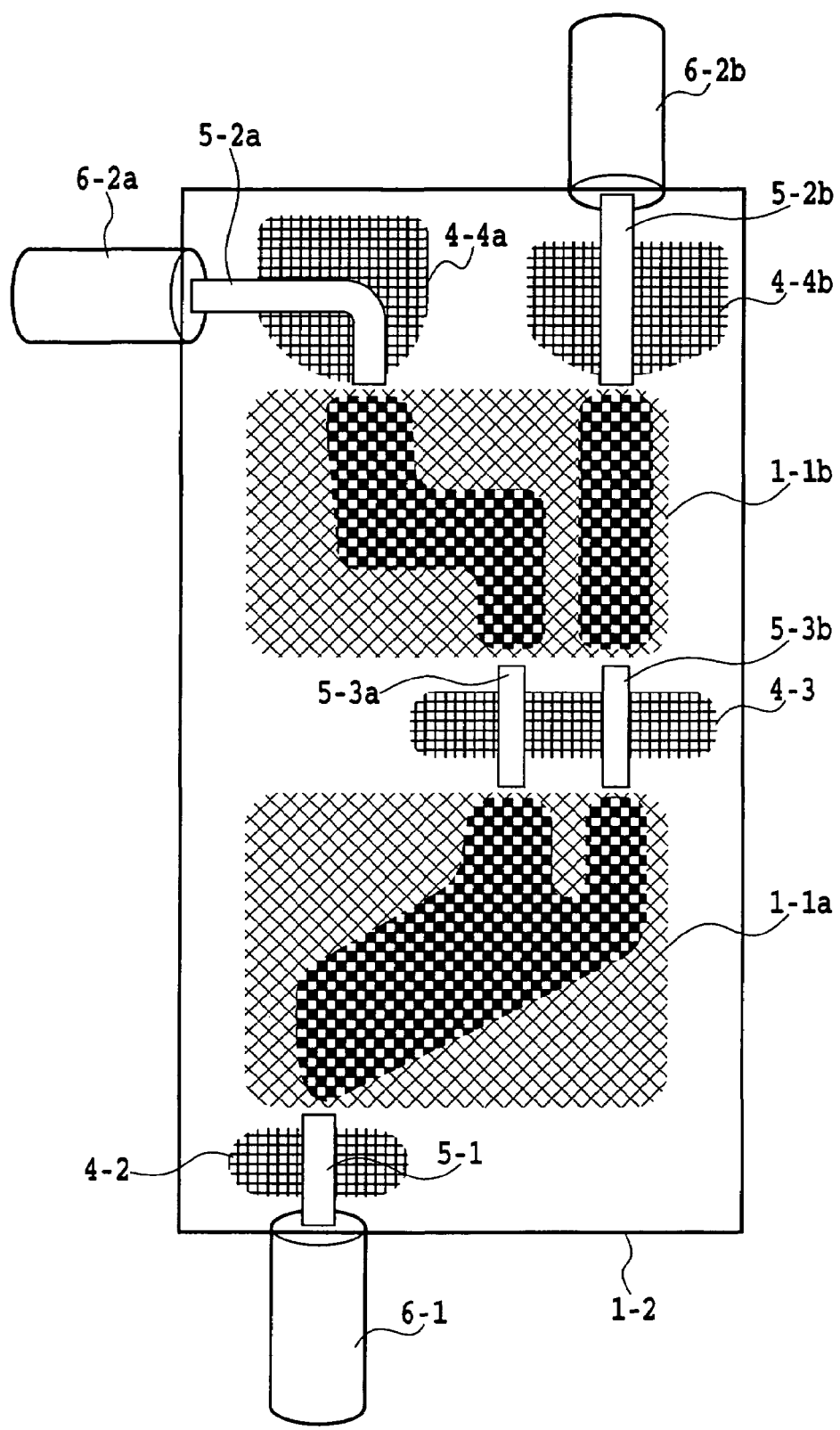
FIG. 14 is a view showing a removing method of a stray light according to a seventh embodiment of the present invention.

FIG. 14 shows a removing method of the stray light according to the seventh embodiment of the present invention. The seventh embodiment is one example of the complex optical circuit having a plurality of optical circuit design regions on which the wave propagation mediums designed by the design procedure shown in FIG. 2 are formed. An optical fiber 6-1 is optically coupled to the input waveguide 5-1 connected to the input port of an optical circuit design region 1-1a. The optical circuit design region 1-1a is, for example, the optical combining/splitting circuit and has two output ports. The output ports are connected via connection waveguides 5-3a and b to the input ports of an optical circuit design region 1-1b, respectively. The optical circuit design region 1-1b is, for example, a filter circuit and has two output ports. The output ports are optically coupled via output waveguides 5-2a and b to optical fibers 6-2a and b, respectively.

In the optical circuit design region 1-1a, as described in the third embodiment, with respect to the optical axis of the input port, the optical axis of the output port is shifted laterally on the coordinate x. Around the input waveguide 5-1, similarly to the fifth embodiment, a stray light guide 4-2 is arranged such that the stray light generated in the connection portion between the optical fiber and the input waveguide is not inputted to the optical circuit design region 1-1a.

Also, around the waveguides 5-3a and b, a stray light guide 4-3 is arranged such that the stray light generated in the connection portion between the output port and the waveguide is not inputted to the optical circuit design region 1-1b. Also around the output waveguides 5-2a and b, stray light guides 4-4a and b are arranged such that the stray light generated in the connection portion between the output port and the waveguide is not coupled to the optical fibers.

In this way, so as to prevent the stray light generated in the connection portion and the stray light generated in the wave propagation medium from being inputted to the optical circuit at the next stage, it is possible to constitute the optical circuits each having the excellent circuit property. Also, by application of the holographic wave propagation medium, miniaturization of the optical circuit can be attained.

In the third to seventh embodiments, by application of the holographic wave propagation medium, miniaturization of the optical circuit is attained. Moreover, the optical axis of the input port and the optical axis of the output port are arranged so as not to be made coincident with each other. Consequently, it is possible to attain the optical functional circuit having the excellent circuit property where the interference is not generated between a plurality of output ports, and the transmission loss and the crosstalk are small.

EIGHTH EMBODIMENT

As mentioned above, the axis displacement and mode mismatch of the optical fiber optically coupled to the input/output waveguide cause the generation of the leakage light and the generation of the stray light. Therefore, connection of the optical waveguide device to which the holographic wave propagation medium is applied is made easier to attain the optical functional circuit where the transmission loss and the crosstalk are small.

Figure 15:
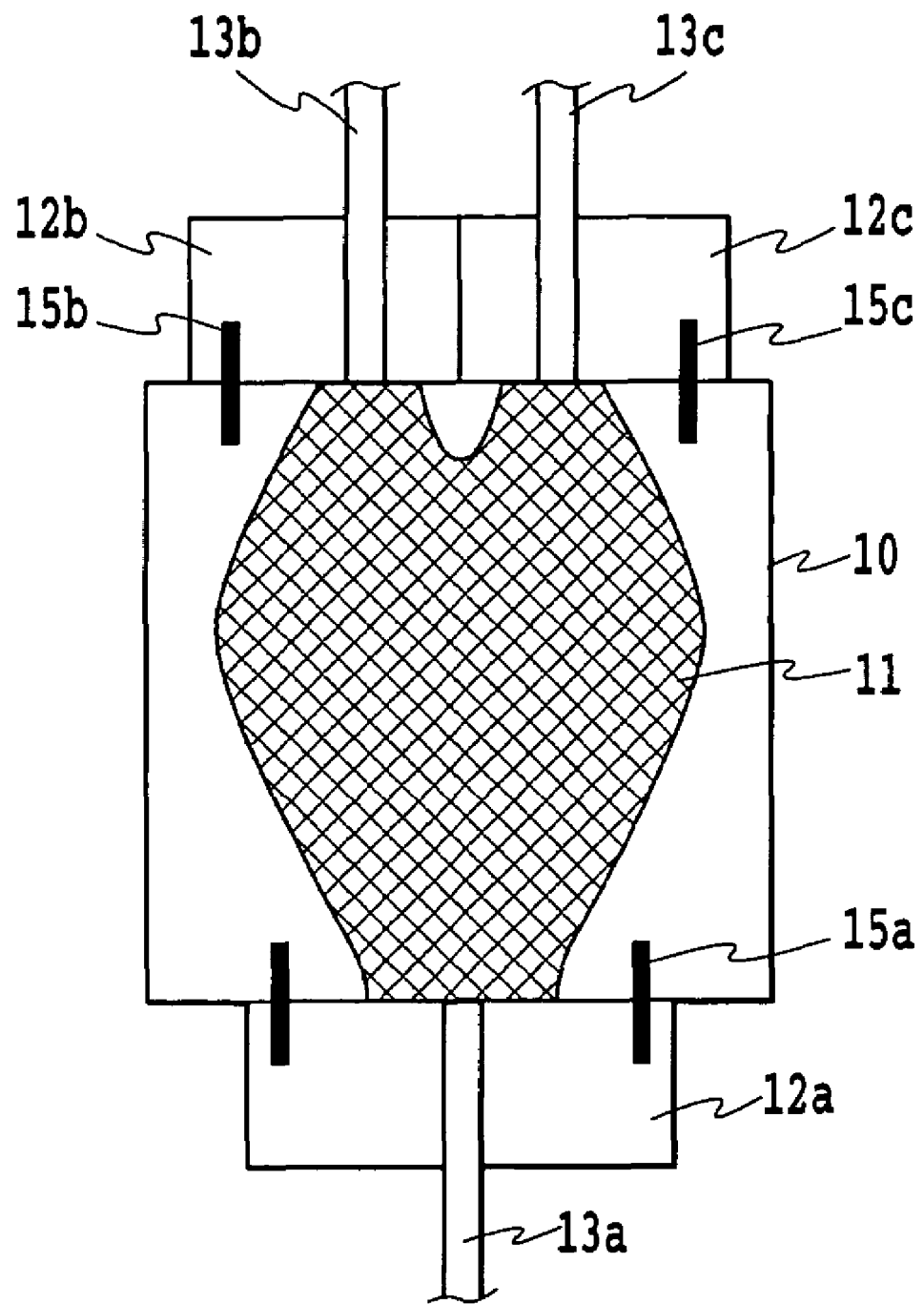
FIG. 15 is a view showing a configuration of an optical waveguide device including an optical combining/splitting circuit according to an eighth embodiment of the present invention.

FIG. 15 shows the configuration of an optical waveguide device including an optical combining/splitting circuit according to the eighth embodiment of the present invention. The optical waveguide device is constituted by connecting the optical fiber to the optical combining/splitting circuit shown in FIG. 3 and enclosing in a package (not shown). The optical fibers 13a to 13c are coupled to an input port on the incidence facet of a wave propagation medium 11 formed on a substrate 10 and the output ports on the exit facet. The optical fibers 13a to 13c are fixed to fixing glass blocks 12a to 12c and coupled to the input and output ports while alignment between the substrate 10 and the glass blocks 12a to 12c is performed.

The wave propagation medium 11 does not have the structural boundary because of the mesh-shaped pixel. Thus, it is difficult to visually discriminate the light focusing positions of the input and output ports. Therefore, on the substrate 10, positioning markers 15a to 15c are formed with reference to the coordinates of the input and output ports determined at the time of the calculation. As for the positioning markers 15a to 15c, a waveguide core may be formed on the substrate 10, or a metal may be formed on the surface of the substrate 10. The alignment can be easily performed by forming the markers corresponding to the light focusing positions of optical fibers 23a to 23c even on the opposite glass blocks 12a to 12c.

NINTH EMBODIMENT

Figure 16:
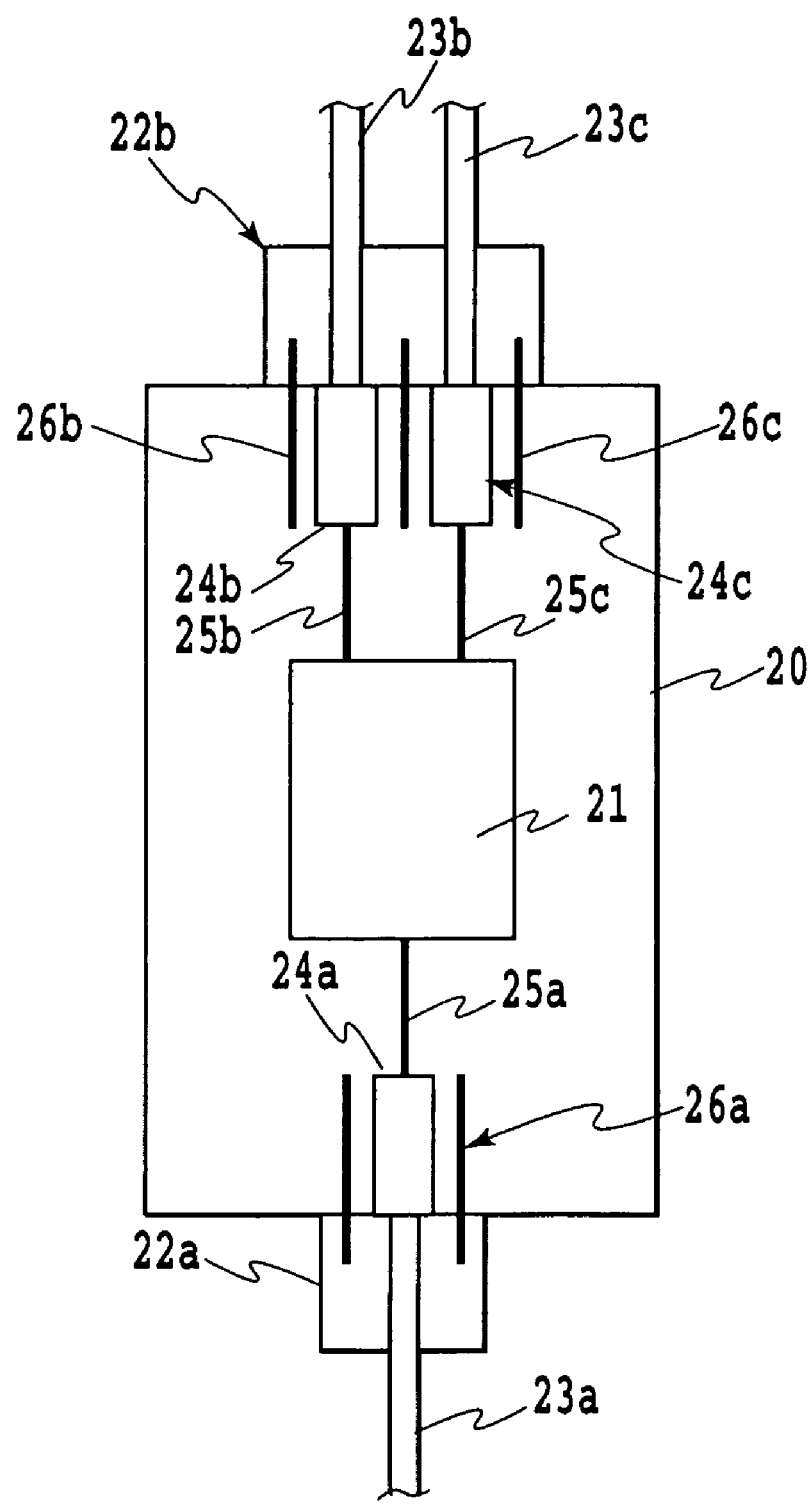
FIG. 16 is a view showing a configuration of an optical waveguide device including an optical combining/splitting circuit according to a ninth embodiment of the present invention.

FIG. 16 shows the configuration of an optical waveguide device including an optical combining/splitting circuit according to the ninth embodiment of the present invention. In the region where the beam diameter of the light near the input and output ports is small, it is necessary to reduce the rate of the component that is obliquely incident with respect to the propagation direction of the light and consequently suppress the crosstalk. Therefore, a waveguide 25a is connected to an input port of a wave propagation medium 21 serving as the optical combining/splitting circuit shown in FIG. 3. Then, optical waveguides 25b and 25c are connected to output ports. Moreover, on a substrate 20, wave propagation mediums 24a to 24c for mode field conversion are formed, thereby improving the coupling efficiency between the optical waveguides 25a to 25c and optical fibers 23a to 23c.

Positioning markers 26a to 26c are used even in the connection between the optical fibers 23a to 23c and the wave propagation mediums 24a to 24c for mode field conversion. That is, on the substrate 20, the positioning markers 26a to 26c are formed with reference to the coordinates of the input and output ports determined at the time of the calculation, and the markers corresponding to the light focusing positions of the optical fibers 23a to 23c are formed even on the opposite glass blocks 22a and 22b. Consequently, alignment can be easily performed.

TENTH EMBODIMENT

Figure 17:
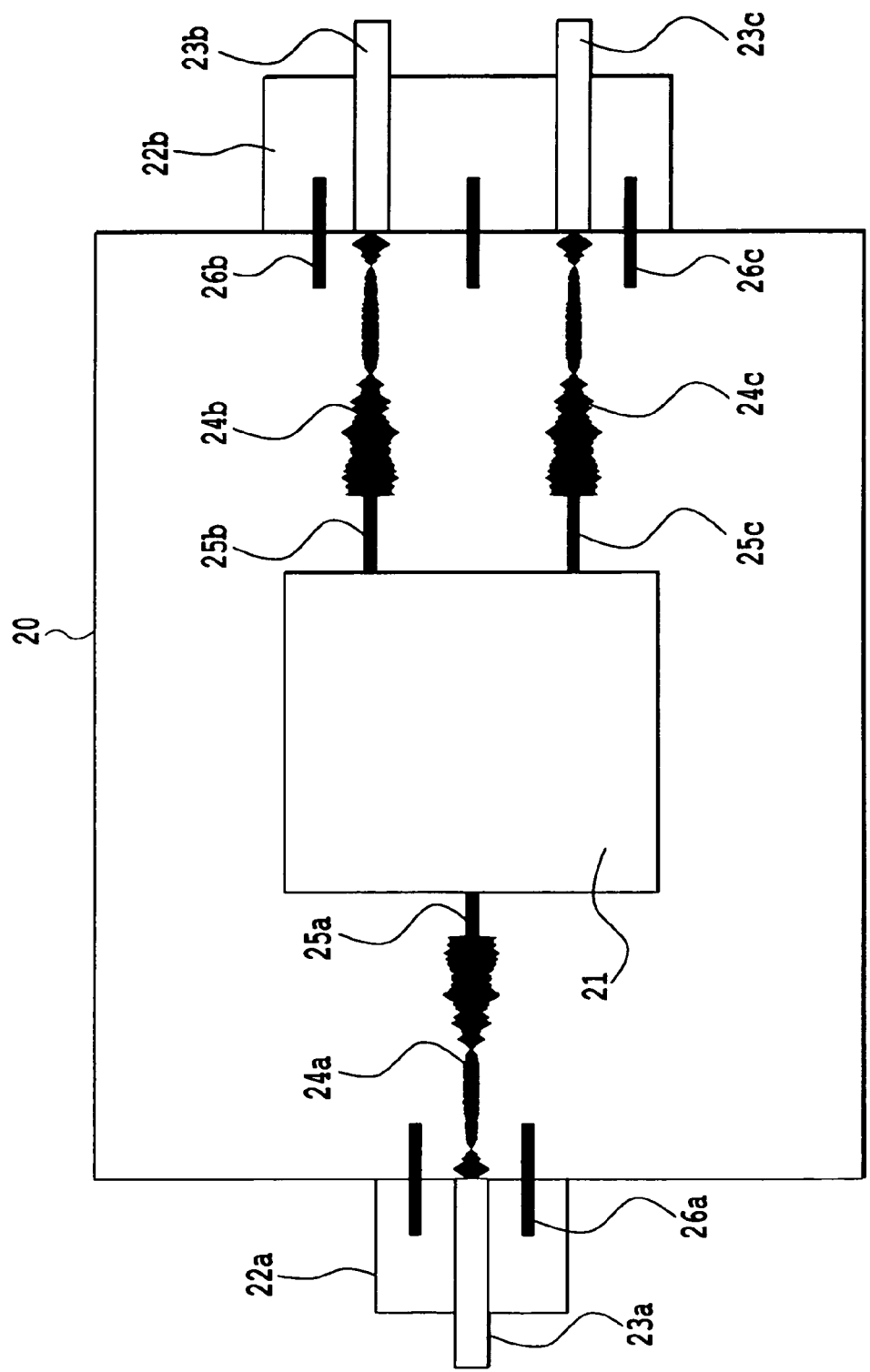
FIG. 17 is a view showing a configuration of an optical waveguide device including an optical combining/splitting circuit according to a tenth embodiment of the present invention.

FIG. 17 shows the configuration of an optical waveguide device including an optical combining/splitting circuit according to the tenth embodiment of the present invention. The difference from the ninth embodiment lies in the difference in the configuration of the wave propagation mediums 24a to 24c for mode field conversion.

In the wave propagation mediums 24a to 24c in the ninth embodiment, the entire refractive index distribution of the wave propagation mediums is determined in accordance with the refractive indexes (here, the binary refractive indexes) possessed by the respective virtual pixels defined by the virtual mesh. In the tenth embodiment, the typical algorithm for determining the above-mentioned spatial refractive index distribution is used to determine the refractive index distribution by modulating a core width of the optical waveguide in an optical axis direction, as shown in FIG. 17.

The configuring method of the width of the core of the wave propagation medium 24a is simply explained. When the refractive index distribution is given which minimizes the phase difference between the field of the signal light inputted from the optical fiber 23a and the field where the field in which the phase of the field of the desirable signal light to be outputted to the wave propagation medium 21 is inverted is propagated to the optical fiber 23a, the inputted signal light can be converted into the desirable output signal light. Specifically, the phase difference between the respective positions in the optical axis direction is calculated. Then, if the phase difference is positive, the core width of the optical waveguide is increased, and if the phase difference is negative, the core width of the optical waveguide is decreased. Consequently, the phase difference is minimized. In accordance with such a configuring method, the width of the core of the optical waveguide which minimizes the phase difference is determined by each calculation. Thus, the inputted signal light can be converted into the desirable output signal light.

ELEVENTH EMBODIMENT

Figure 18:
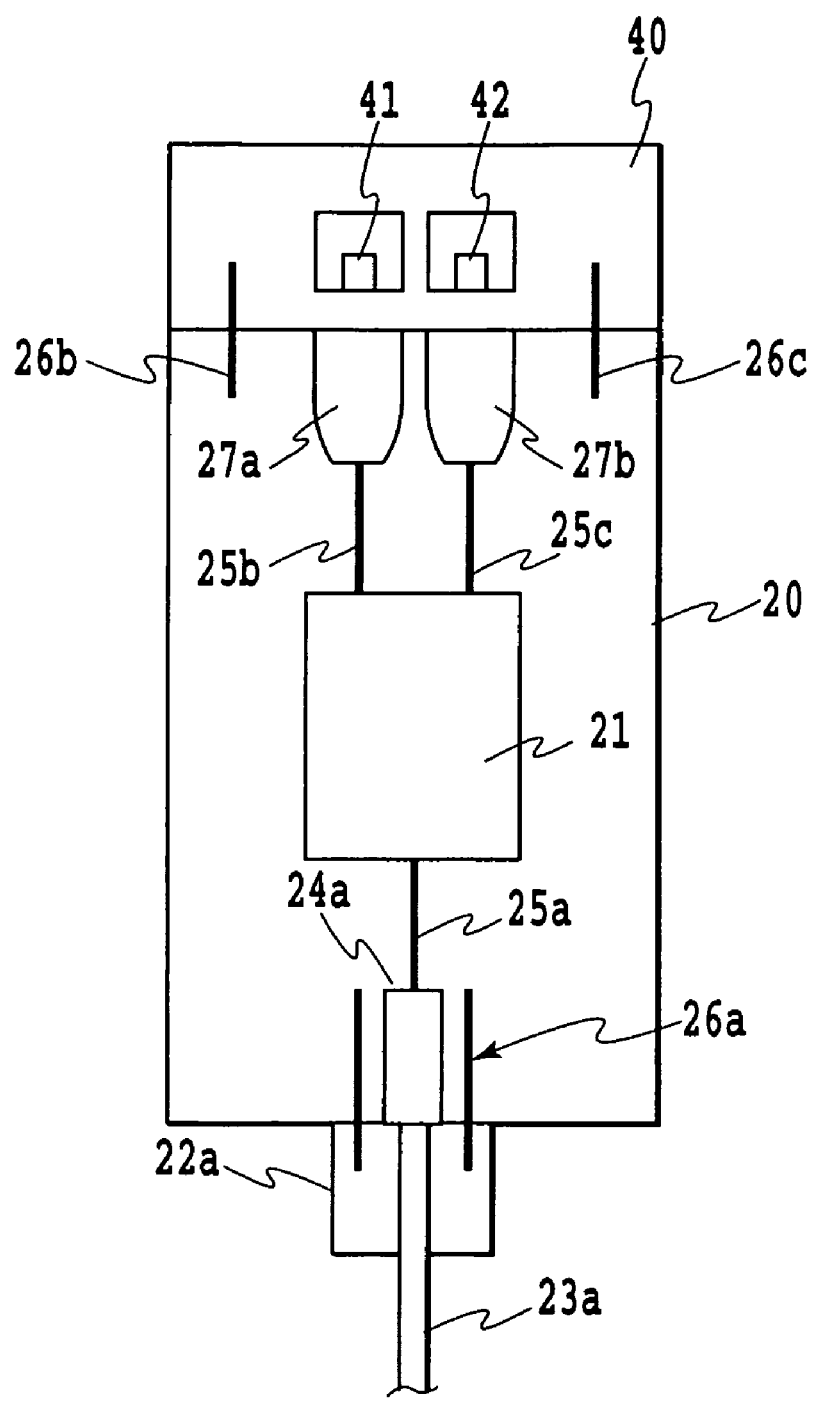
FIG. 18 is a view showing a configuration of an optical waveguide device including an optical combining/splitting circuit according to an eleventh embodiment of the present invention.

FIG. 18 shows the configuration of an optical waveguide device including an optical combining/splitting circuit according to the eleventh embodiment of the present invention. The substrate 20, on which the wave propagation medium 21 serving as the optical combining/splitting circuit shown in FIG. 3 is formed, and a substrate 40, on which a light emitting element 41 and a light receiving element 42 are placed, are coupled and enclosed in a package (not shown). Consequently, the optical waveguide device is constituted. Optical waveguides 25b and 25c are connected to the output ports of the wave propagation medium 21, and wave propagation mediums 27a and 27b serving as light collecting lenses are formed, thereby improving the coupling efficiency to the light emitting element 41 and the light receiving element 42.

Even for the connection between the wave propagation mediums 27a and 27b serving as the light collecting lenses and the light emitting element 41 and the light receiving element 42, positioning markers 26b and 26c are used. In this way, since the light collecting lenses are formed as the wave propagation mediums on the substrate, the optical waveguide device can be miniaturized. Conventionally, when the optical waveguide device is manufactured, the optical axis alignment is required among the light emitting element and the light receiving element, the light collecting lens, and the optical combining/splitting device. However, according to this embodiment, only the alignment by the positioning markers is performed, which can reduce the manufacturing step of the optical waveguide device.

TWELFTH EMBODIMENT

Figure 19:
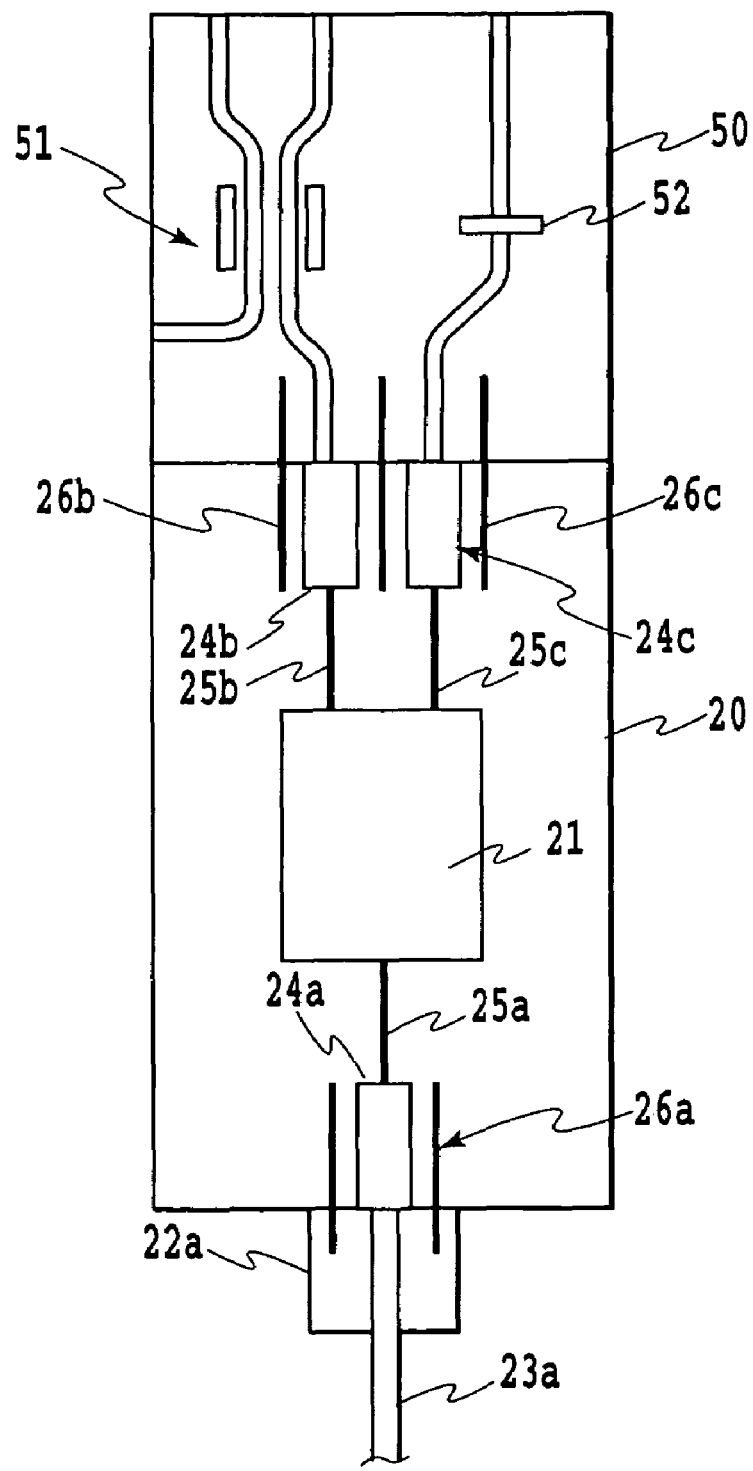
FIG. 19 is a view showing a configuration of an optical waveguide device including an optical combining/splitting circuit according to a twelfth embodiment of the present invention.

FIG. 19 shows the configuration of an optical waveguide device including an optical combining/splitting circuit according to the twelfth embodiment of the present invention. The substrate 20, on which the wave propagation medium 21 serving as the optical combining/splitting circuit shown in FIG. 3 is formed, and a substrate 50, for example, on which an optical switch 51 and an optical filter 52 are formed, are coupled and enclosed in a package (not shown). Consequently, the optical waveguide device is constituted. The optical waveguides 25b and 25c of the substrate 20 and the optical waveguide of the substrate 50 are connected by the wave propagation mediums 24b and 24c for mode field conversion.

For the alignment for the connection, similarly to the case of the optical fiber in FIG. 16, the positioning markers 26b and 26c are used. In this way, even the connection between a conventional PLC circuit and the wave propagation medium can be easily performed by using the positioning marker. According to the eighth and ninth embodiments and this embodiment, the optical waveguide devices of the various configurations can be easily combined.

THIRTEENTH EMBODIMENT

Figure 20:
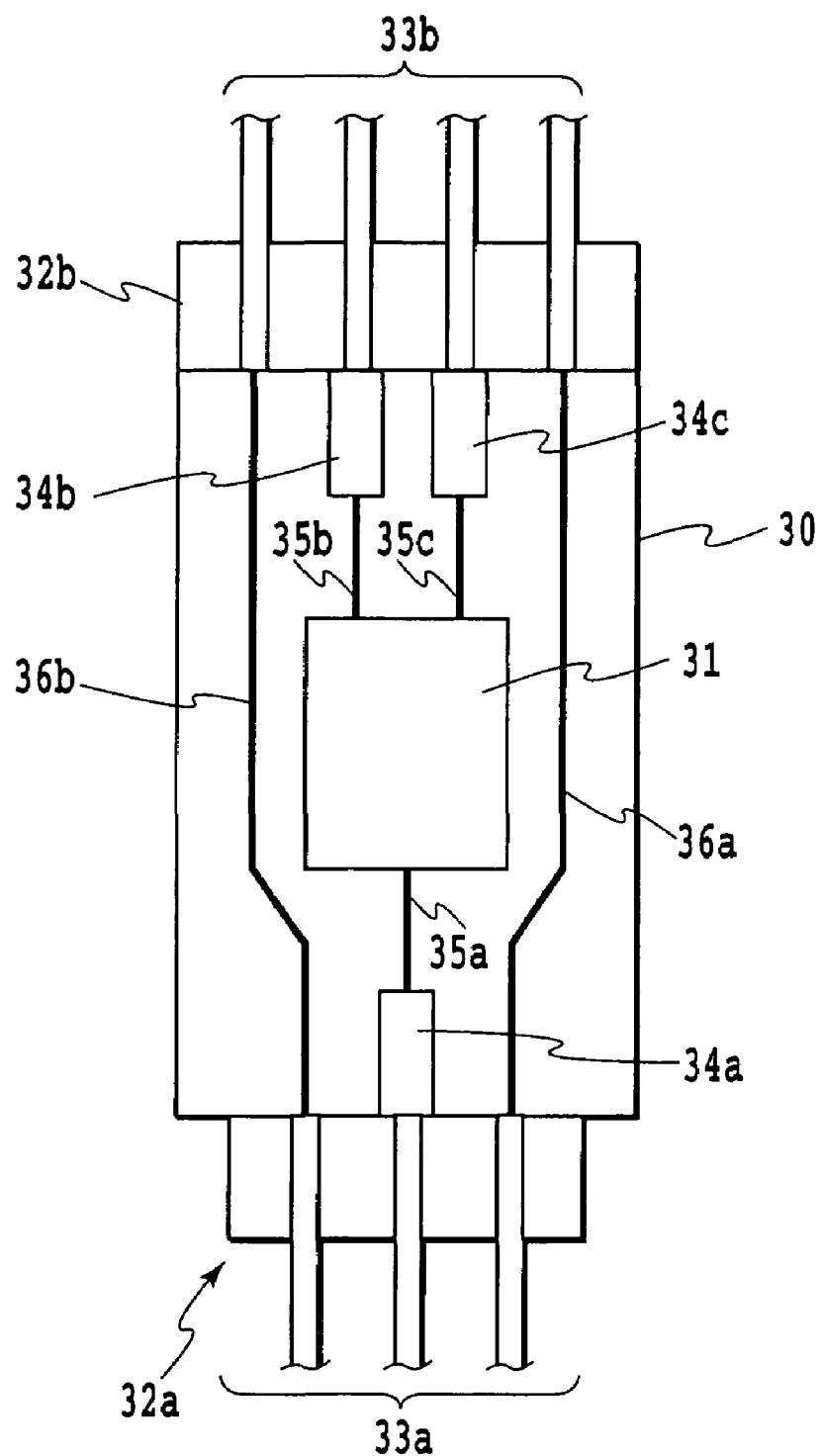
FIG. 20 is a view showing a configuration of an optical waveguide device including an optical combining/splitting circuit according to a thirteenth embodiment of the present invention.

FIG. 20 shows the configuration of an optical waveguide device including an optical combining/splitting circuit according to the thirteenth embodiment of the present invention. A waveguide 35a is connected to an input port of a wave propagation medium 31 on a substrate 30, and optical waveguides 35b and 35c are connected to an output port. Similarly to the ninth embodiment, wave propagation mediums 34a to 34c for mode field conversion are further formed, thereby improving the coupling efficiency between the optical waveguides 35a to 35c and optical fibers 33a and 33b for input and output.

The connection between the wave propagation r mediums 34a to 34c for mode field conversion and the optical fibers 33a and 33b for input and output, monitoring waveguides 36a and 36b are used. That is, on the substrate 30, ports of the monitoring waveguides 36a and 36b are formed with reference to the coordinate of the input and output ports determined at the time of the calculation. Then, the optical fibers 33a and 33b for positioning, which correspond to the light focusing positions of the optical fibers, are held even for opposite glass blocks 32a and 32b. A light source and an optical power meter are connected via the optical fibers 33a and 33b for positioning and the monitoring waveguides 36a and 36b. Then, while the optical intensities are measured, the connection positions are determined. Thus, it is possible to easily perform the alignment between the wave propagation mediums 34a to 34c for mode field conversion and the optical fibers 33a and 33b for input and output.

FOURTEENTH EMBODIMENT

Figure 21:
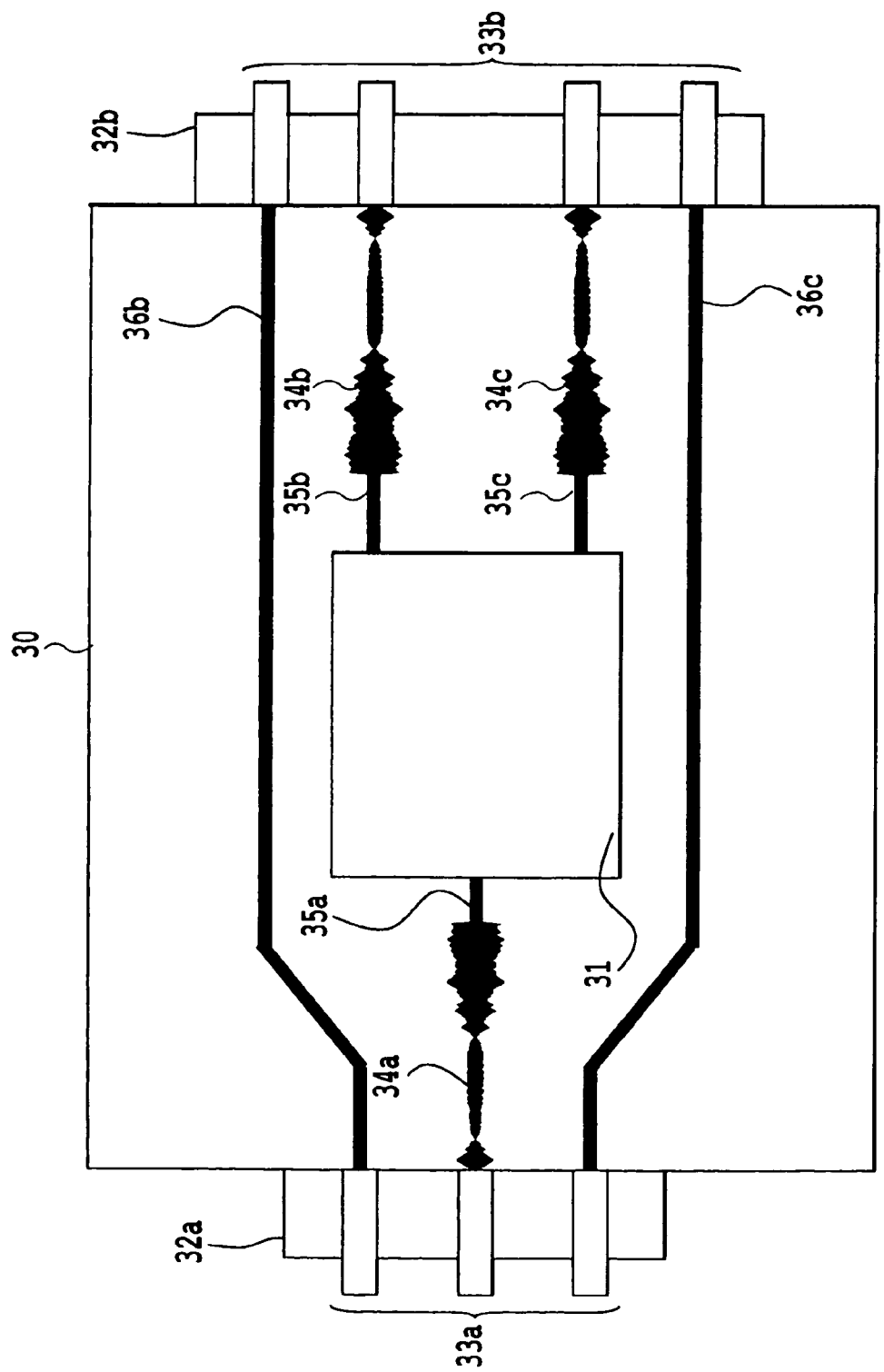
FIG. 21 is a view showing a configuration of an optical waveguide device including an optical combining/splitting circuit according to a fourteenth embodiment of the present invention.

FIG. 21 shows the configuration of an optical waveguide device including an optical combining/splitting circuit according to the fourteenth embodiment of the present invention. The difference from the thirteenth embodiment lies in the structure that the wave propagation mediums 34a to 34c for mode field conversion are the wave propagation mediums in which the waveguide widths are modulated, similarly to the tenth embodiment.

According to the eighth to fourteenth embodiments, by using the positioning markers or monitoring waveguides formed on the substrate, the optical waveguide device to which the holographic wave propagation medium is applied can be easily connected.

FIFTEENTH EMBODIMENT

Figure 22:
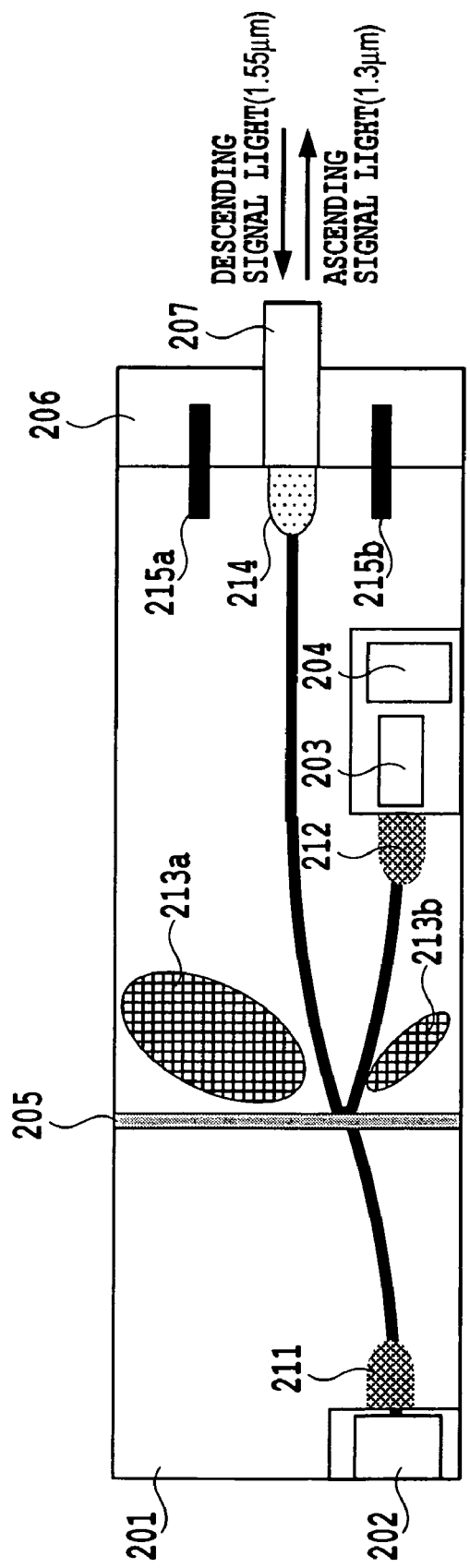
FIG. 22 is a view showing a configuration of an optical line termination apparatus according to a fifteenth embodiment of the present invention.

FIG. 22 shows the configuration of an optical network unit (ONU) according to the fifteenth embodiment of the present invention. The ONU is the apparatus installed in a subscriber house in an optical fiber subscriber network, and the optical signal is transmitted to and received from an optical line terminal (OLT) on a station side. A wavelength of 1.55 μm is used in a descending signal of OLT-ONU, and a wavelength of 1.55 μm is used in an ascending signal of the OLT-ONU.

The ONU is provided with a PD202 for receiving the descending signal, an LD203 for transmitting the ascending signal, a monitor PD204 for monitoring a power of an output light of the LD203, and a WDM filter 205 for combining and splitting the ascending signal and the descending signal, on a PLC substrate 201. Also, the signal which is wavelength-multiplexed by the WDM filter 205 is connected to the OLT via an optical fiber 207 fixed to a glass block 206. In the ONU, the leakage light is generated in the connection portions between the PD202 and the optical waveguide, between the LD203 and the optical waveguide, between the WDM filter 205 and the optical waveguide, and between the optical fiber 207 and the optical waveguide.

Therefore, the removing method of the leakage light described in the above-mentioned embodiments and the like are applied. The wave propagation mediums 211 and 212 have the function of the light collecting lens, as described in the eleventh embodiment and improve the coupling efficiencies between the PD202 and the optical waveguide and between the LD203 and the optical waveguide, respectively. At the intersection portion of the WDM filter and the optical waveguide, as described in the first and second embodiments, the stray light guides 213a and 213b constituted by the wave propagation mediums are installed, thereby preventing the leakage light from being again coupled to the optical waveguide. Moreover, as described in the eighth embodiment, the markers 215a and 215b are used for the connection between the PLC substrate 201 and the glass block 206. As described in the ninth embodiment, the wave propagation medium 21 for mode field conversion is used for the coupling between the optical fiber 207 and the optical waveguide.

In this way, by improving the coupling efficiency of the optical coupling at each connection portion and further suppressing the crosstalk, it is possible to avoid the deterioration in S/N as an optical receiver. Also, the connection at the mounting step is made easier, which can reduce the number of the mounting steps and consequently improve the productivity.

The invention claimed is:

1. An optical functional circuit in which a plurality of circuit elements are formed on a substrate, comprising:
   a wave propagation medium for converting an optical path of a leakage light that is not emitted from a predetermined output port of the circuit element so as to prevent the leakage light from being coupled to a different circuit element,
   wherein the wave propagation medium comprises an optical waveguide, which is provided with a clad layer formed on the substrate and a core embedded in the clad layer, and the wave propagation medium has a spatial refractive index distribution for outputting the leakage light launched into the circuit element to other port as output-light with multiple scattering through the wave propagation medium,
   said spatial refractive index distribution is designated by each refractive index of pixels defined by a mesh, said each refractive index of the pixels is determined by calculating a phase difference between a forward propagation of the input field of the leakage light and a reverse propagation of the output field of the output-light at each pixel and repeating calculations until said phase difference becomes less than a desired value.

2. The optical functional circuit according to claim 1, wherein the refractive index distribution of the wave propagation medium is determined by modulating a width of the optical waveguide in an optical axis direction.

3. An optical functional circuit having an optical waveguide provided with a clad layer formed on a substrate and a core portion embedded in the clad layer, comprising:
   a wave propagation medium for outputting input-light that is launched into an input port to an output port as output-light, said input port and output port each being defined as a location of a circuit at which a cross section of a field of said input-light or said output-light is given in a cross section perpendicular to a propagation direction of said input-light,
   wherein the wave propagation medium has a spatial refractive index distribution for outputting the input-light launched into the input port to the output port as the output-light with multiple scattering through the wave propagation medium,
   said spatial refractive index distribution is designated by each refractive index of pixels defined by a mesh, said each refractive index of the pixels is determined by calculating a phase difference between a forward propagation of the input field of the input-light and a reverse propagation of the output field of the output-light at each pixel and repeating calculations until said phase difference becomes less than a desired value,
   in order that among optical signals made incident from the input port defined in the wave propagation medium, a stray light that is not emitted from a predetermined output port defined in the wave propagation medium is not coupled to a different output port, an optical axis of the input port and an optical axis of the predetermined output port are arranged so as not to be made coincident with each other.

4. The optical functional circuit according to claim 3, wherein, assuming that it is a half value θ of a beam divergence angle of the input-light from the input port, the predetermined output port is arranged outside a region sandwiched between two lines of an angle θ from the input port, with respect to the optical axis of the input port.

5. An optical functional circuit having an optical waveguide provided with a clad layer formed on a substrate and a core portion embedded in the clad layer, comprising:
   a wave propagation medium for outputting input-light that is launched into an input port to an output port as output-light, said input port and output port each being defined as a location of a circuit at which a cross section of a field of said input-light or said output-light is given in a cross section perpendicular to a propagation direction of said input-light,
   wherein the wave propagation medium has a spatial refractive index distribution for outputting the input-light launched into the input port to the output port as the output-light with multiple scattering through the wave propagation medium,
   said spatial refractive index distribution is designated by each refractive index of pixels defined by a mesh, said each refractive index of the pixels is determined by calculating a phase difference between a forward propagation of the input field of the input-light and a reverse propagation of the output field of the output-light at each pixel and repeating calculations until said phase difference becomes less than a desired value,
   wherein on the substrate, positioning markers for defining input and output ports defined in the wave propagation medium are formed, and
   (a) the positioning markers, which are formed on members having optical parts optically coupled to the input and output ports and define light focusing positions of the optical parts, and (b) the positioning markers for defining the input and output ports are aligned, thereby coupling the input and output ports and the optical parts optically.

6. An optical functional circuit having an optical waveguide provided with a clad layer formed on a substrate and a core portion embedded in the clad layer, comprising:
   a wave propagation medium for outputting input-light that is launched into an input port to an output port as output-light, said input port and output port each being defined as a location of a circuit at which a cross section of a field of said input-light or said output-light is given in a cross section perpendicular to a propagation direction of said input-light,
   wherein the wave propagation medium has a spatial refractive index distribution for outputting the input-light launched into the input port to the output port as the output-light with multiple scattering through the wave propagation medium,
   said spatial refractive index distribution is designated by each refractive index of pixels defined by a mesh, said each refractive index of the pixels is determined by calculating a phase difference between a forward propagation of the input field of the input-light and a reverse propagation of the output field of the output-light at each pixel and repeating calculations until said phase difference becomes less than a desired value,
   wherein on the substrate, monitoring waveguides for defining input and output ports defined in the wave propagation medium are formed from an end facet on which the input port is formed to an end facet on which the output port is formed, and
   (a) optical fibers for positioning, which are formed on members having optical parts optically coupled to the input and output ports and define light focusing positions of the optical parts, and (b) the monitoring waveguides are aligned, thereby coupling the input and output ports and the optical parts optically.

7. The optical functional circuit according to claim 5, wherein the optical part which is coupled to at least one of the input and output ports is an optical fiber, and the member is a glass block for fixing the optical fiber.

8. The optical functional circuit according to claim 5, wherein the optical part which is coupled to at least one of the input and output ports is any of a light emitting element and a light receiving element, and the wave propagation medium is the wave propagation medium serving as a light collecting lens.

9. The optical functional circuit according to claim 5, wherein the optical part which is coupled to at least one of the input and output ports is an optical waveguide, and the wave propagation medium is the wave propagation medium for mode field conversion.

10. The optical functional circuit according to claim 6, wherein the optical part which is coupled to at least one of the input and output ports is an optical fiber, and the member is a glass block for fixing the optical fiber.

11. The optical functional circuit according to claim 6, wherein the optical part which is coupled to at least one of the input and output ports is any of a light emitting element and a light receiving element, and the wave propagation medium is the wave propagation medium serving as a light collecting lens.

12. The optical functional circuit according to claim 6, wherein the optical part which is coupled to at least one of the input and output ports is an optical waveguide, and the wave propagation medium is the wave propagation medium for mode field conversion.

* * * * *